United States Patent
Ding et al.

(10) Patent No.: US 11,520,020 B2
(45) Date of Patent: Dec. 6, 2022

(54) ELECTRONIC DEVICE AND METHOD

(71) Applicant: Sony Semiconductor Solutions Corporation, Kanagawa (JP)

(72) Inventors: Qing Ding, Stuttgart (DE); Alper Ercan, Stuttgart (DE); Ward Van Der Tempel, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 949 days.

(21) Appl. No.: 16/235,692

(22) Filed: Dec. 28, 2018

(65) Prior Publication Data

US 2019/0204446 A1 Jul. 4, 2019

(30) Foreign Application Priority Data

Dec. 29, 2017 (EP) .................................. 17211204

(51) Int. Cl.
*G01S 7/4863* (2020.01)
*G01S 7/4915* (2020.01)
*H04N 5/378* (2011.01)
*G01S 17/36* (2006.01)
*G01S 7/4865* (2020.01)
*G01S 17/894* (2020.01)
*H04N 5/3745* (2011.01)

(52) U.S. Cl.
CPC .......... *G01S 7/4863* (2013.01); *G01S 7/4865* (2013.01); *G01S 7/4915* (2013.01); *G01S 17/36* (2013.01); *G01S 17/894* (2020.01); *H04N 5/378* (2013.01); *H04N 5/3745* (2013.01)

(58) Field of Classification Search
CPC ...... G01S 7/4863; G01S 7/4865; G01S 17/36; G01S 17/894; H04N 5/3745; H04N 5/378
See application file for complete search history.

(56) References Cited

U.S. PATENT DOCUMENTS

| 7,157,685 | B2 | 1/2007 | Bamji et al. |
| 2014/0043598 | A1 | 2/2014 | Bamji et al. |
| 2017/0075421 | A1* | 3/2017 | Na ............................ G06T 7/74 |
| 2019/0020837 | A1* | 1/2019 | Lo ......................... H04N 5/3535 |

FOREIGN PATENT DOCUMENTS

EP  3 171 199 A1  5/2017

OTHER PUBLICATIONS

Wang et al., Compact Ambient Light Cancellation Design and Optimization for 3D Time-of-Flight Image Sensors. 2013. 4 pages.

* cited by examiner

*Primary Examiner* — Thanh Luu
(74) *Attorney, Agent, or Firm* — Wolf, Greenfield & Sacks, P.C.

(57) ABSTRACT

An electronic device comprising circuity configured to integrate charge collected by at least two floating diffusions on at least one capacitor and to change the direction of charge integration from a first current flow direction to a second current flow direction between a first integration phase and a second integration phase.

15 Claims, 31 Drawing Sheets

Readout

ELECTRONIC DEVICE AND METHOD

CROSS REFERENCE TO RELATED APPLICATIONS

The present application claims priority to European Patent Application serial number 17211204.7 filed in the European Patent Office on Dec. 29, 2017, the entire contents of which is incorporated herein by reference.

TECHNICAL FIELD

The present disclosure generally pertains to the field of electronic devices, in particular to electronic circuits for imaging devices.

TECHNICAL BACKGROUND

A 3D time-of-flight (TOF) camera illuminates the scene with a modulated light source and observes the reflected light. The phase shift between the illumination and the reflection is measured and translated to distance.

In an outdoor application of a 3D TOF camera, the ambient light produces a Common Mode (CM) component that is quite large compared with the useful active light reflected back by the scene. The large ambient light may saturate the pixels of the TOF sensor. Electronic circuits such as amplifiers should generally be designed to minimise or eliminate common mode effects so that Differential Mode (DM) components can be appropriately obtained.

There are various ways proposed to cancel out the ambient light, e.g. using optical filter, shortening the integration time, enlarging the well-capacitor etc. However, these ways are normally costly, needing a large chip area which results in large pixel pitch, and needing high speed readout operations which results in high power consumptions etc.

US patent application US 2014/0043598 A1 proposes a method to cancel the CM components by connecting two integration capacitors anti-parallel (APC="antiparallel coupling") between multi-integrations. The DM components are accumulated in the capacitor pair and can be read out at one time after certain times of multi-integrations.

Although there exist techniques for cancelling the CM components, it is generally desirable to find alternatives or better techniques for cancelling the CM components in an electronic circuit.

SUMMARY

According to a first aspect, the disclosure provides an electronic device comprising circuitry configured to integrate charge collected by at least two floating diffusions on at least one capacitor, and to change the direction of charge integration from a first current flow direction to a second current flow direction between a first integration phase and a second integration phase.

According to a further aspect, the disclosure provides a method comprising integrating charge collected by at least two floating diffusions on at least one capacitor, and changing the direction of charge integration from a first current flow direction to a second current flow direction between a first integration phase and a second integration phase.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
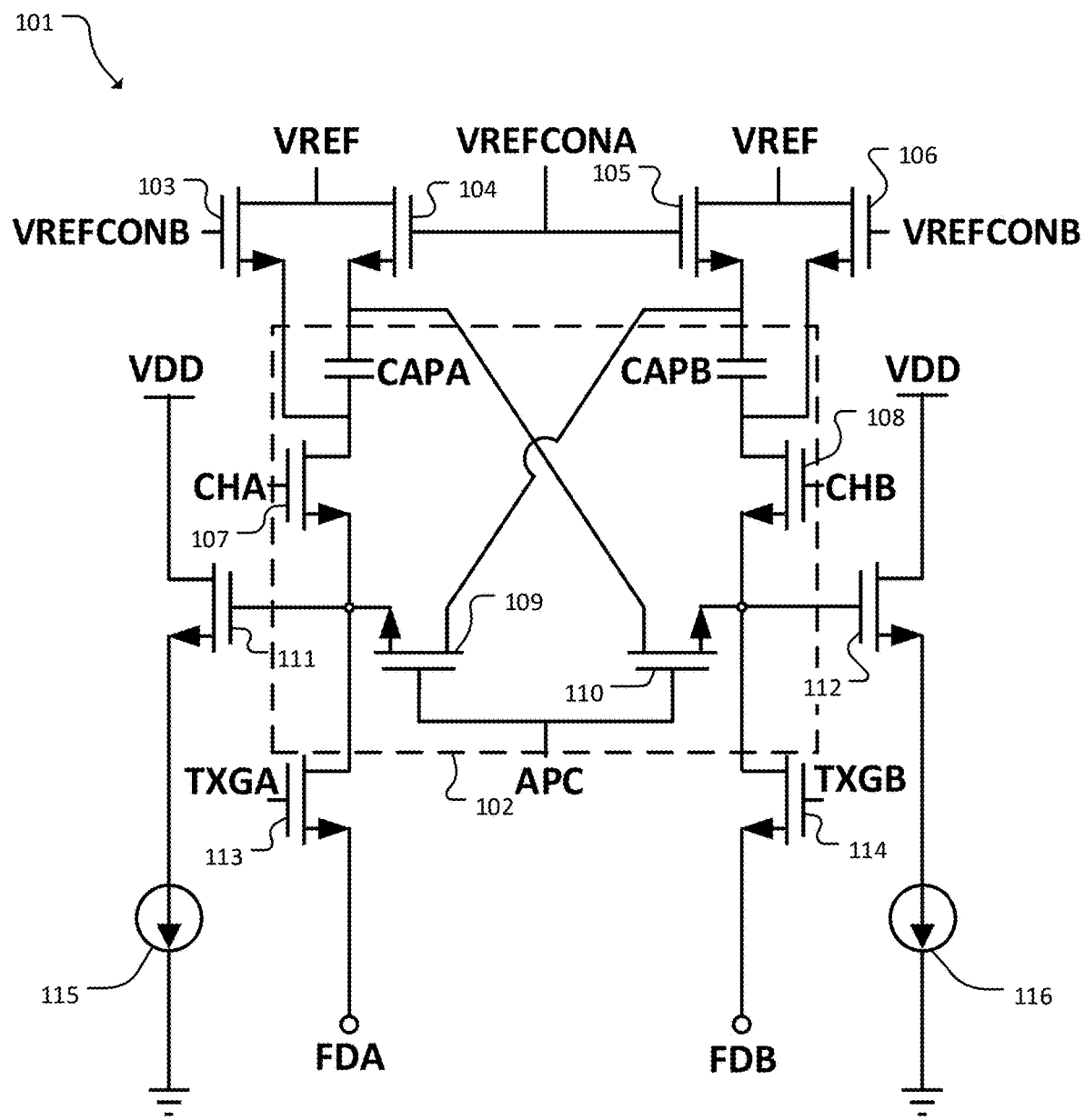
FIG. 1 is a schematic diagram of a 2FD APC based CMR circuit.

The embodiments described below provide electronic devices comprising circuitry configured to integrate charge collected by at least two floating diffusions on at least one capacitor, and to change the direction of charge integration from a first current flow direction to a second current flow direction between a first integration phase and a second integration phase.

The electronic device may for example be implemented in an image sensor of a phase-shift time of flight camera (TOF) depth imaging system. In particular, the electronic device may be provided for each pixel of the TOF sensor. A pixel may for example be a differential pixel and its dedicated electronics. The electronic device may for example provide the functionality of a common mode rejection circuit.

The embodiments described below may for example relate to common mode (CM) rejection circuits which are based on an APC (antiparallel coupling) of two capacitors.

In the embodiments described below in more detail, Anti-Parallel Connection (APC) based Common Mode Rejection (CMR) circuits with several floating diffusions are provided. The circuits may apply improved multi-integration by integrating alternatively on both sides of a capacitor or on both sides of a capacitor pair and APC operation of the capacitors to cancel out the CM components and accumulate DM component.

The circuitry may include any electric elements, semiconductor elements, switches, amplifiers, transistors, processing elements, and the like.

A capacitor may be any storage element that accumulates charge. For example, a capacitor may be a passive two-terminal electrical component that stores electrical energy in an electric field. Capacitance may exist between any two electrical conductors of a circuit in sufficient proximity. A capacitor may specifically be designed to provide and enhance the capacitance effect by consideration of size, shape, and positioning of closely spaced conductors, and the intervening dielectric material.

The capacitors may for example be provided to integrate the current output of a pixel of a TOF camera.

Circuitry for controlling whether the integration at the capacitors is done according to the first current flow direction or according to the second current flow direction may for example comprise switches. The switches may for example be transistors, for example field-effect transistors such as MOSFETs.

A floating diffusion, also called "sense node" stores charge for readout, e.g. in a photogate pixel sensor. It may for example be a region in an active silicon (diffusion) region of an image sensor electrically isolated from all other nodes. It may for example be a quasi-neutral region isolated by p-n junction from other nodes.

Charge collected by the at least two floating diffusions may for example be electrons from electron-hole pairs produced by a photo-sensing region. A photodiode may be provided to convert light into an electrical current. The photodiode empties its charge into the floating diffusion, which is protected from light. Then the floating diffusion stores the charge.

A capacitor may comprise a first side and a second side, the first current flow direction being from the first side to the second side, and the second current flow direction being from the second side to the first side. For example, the first side and the second side of a capacitor may correspond to the two-terminals of the capacitor, for example the two-terminals of a passive two-terminal electrical component.

The circuitry may be configured to connect, in a first integration phase, the first side of the at least one capacitor to floating diffusions and the second side of the at least one capacitor to a reference voltage, and to connect, in a second integration phase, the second side of the at least one capacitor to the floating diffusions and the first side of the at least one capacitor to a reference voltage.

In embodiments with two or more capacitors, the circuitry may further comprises an APC circuitry for performing antiparallel coupling of the two capacitors after an integration phase. That is, after every integration, the capacitors may be anti-parallel connected. By anti-parallel connecting the capacitors the sign of the signal stored in the capacitor is changed and it leads to the subtraction of the two stored signals. The anti-parallel connection results in cancelling the common mode (CM) signal and resolves the differential mode (DM) signal. The APC phase may for example follow after each integration phase, e.g. after the first integration phase and after the second integration phase. The APC circuitry may for example comprise switches, e.g. two, four, or any other number of switches.

In embodiments with APC circuitry, a control signals may be configured to control the circuity so that no APC is performed.

The circuity may be configured to perform multiple integrations subsequently with different current flow directions. For example, the circuitry may be configured to repeat the first integration phase and the second integration phase multiple times. That is, integration (and, if applicable, also APC) may be repeated even times. This may allow accumulating a large enough DM signal which is read out in the readout phase. By repeating the operation for a predefined number of times, the DM signal may be free of mismatch effect and may accumulate until it is big enough for readout.

The circuitry may further be configured to provide a reset phase wherein the floating diffusions are reset to reference voltage. For example, all the nodes of the electronic circuit may be reset to a reference voltage by turning on all control signals, i.e. the switches or transfer gates that are related to these control signals.

According to an embodiment, the circuitry comprises a first capacitor and a second capacitor and a first floating diffusion and a second floating diffusion. For example, the electronic circuitry may be a 2FD Anti-Parallel Connection (APC) based Common Mode Rejection (CMR) circuit. A 2FD structure has high flexibility since it can be configured to a regular pixel.

In a 2FD Anti-Parallel Connection (APC) based Common Mode Rejection (CMR) circuit, the circuity may be configured to integrate, in the first integration phase, charge collected by the first floating diffusion on the first capacitor and charge collected by the second floating diffusion on the second capacitor, and to integrate, in the second integration phase, charge collected by the second floating diffusion on the first capacitor and charge collected by the first floating diffusion on the second capacitor.

According to an alternative embodiment, the circuitry may comprise a first capacitor, a second capacitor, a first floating diffusion, a second floating diffusion, a third floating diffusion, and a fourth floating diffusion. For example, the electronic circuitry may be a 4FD Anti-Parallel Connection (APC) based Common Mode Rejection (CMR) circuit.

In a 4FD Anti-Parallel Connection (APC) based Common Mode Rejection (CMR) circuit the circuity may be configured to integrate, in the first integration phase, charge collected by the first floating diffusion on the first capacitor and charge collected by the second floating diffusion on the second capacitor, and to integrate, in the second integration phase, charge collected by the third floating diffusion on the first capacitor and charge collected by the first floating diffusion on the second capacitor.

According to yet an alternative embodiment, the circuitry may comprise a chopper circuitry, wherein the chopper circuitry is configured to change the current directions between a first integration phase and a second integration phase.

According to yet an alternative embodiment, the circuitry may comprise a capacitor, a first floating diffusion and a second floating diffusion, and wherein the circuity is further configured to integrate, in the first integration phase, charge collected by the first floating diffusion on the capacitor, and to integrate, in the second integration phase, charge collected by the second floating diffusion on the capacitor.

According to yet an alternative embodiment, the circuitry may comprise a first capacitor, a second capacitor, a third capacitor, a first floating diffusion and a second floating diffusion, and wherein the circuity is further configured to integrate, in the first integration phase, charge collected by the second floating diffusion on the first, second and third capacitor, and to integrate, in the second integration phase, charge collected by the first floating diffusion on the first, second and third capacitor.

The electronic device may further comprise circuitry for generating control signals for driving switches such that the direction of charge integration is changed. For example, this circuitry for generating control signals may comprise a clock generator that produces a timing signal for use in synchronizing a circuit's operation. The signal can range from a simple symmetrical square wave to more complex arrangements.

The control signals may for example comprise an APC control signal that controls the anti-parallel connection of two capacitors, transfer gate control signals that open or close transfer gates, reference voltage control signals that control switches so that a reference voltage is directed to either a first or a second side of the two capacitors. For example transfer gates may be provided to transfer current from the floating diffusions on the capacitors. Respective control signals may control these transfer gates.

The electronic device may further comprise source followers that are provided at each output of the circuit which amplify the output signal in the readout phase.

Control signals provided to APC switches may be configured to be non-overlapping clock signals. This may avoid charge loss.

The embodiments described below also provide methods comprising integrating charge collected by at least two floating diffusions on at least one capacitor, and changing the direction of charge integration from a first current flow direction to a second current flow direction between a first integration phase and a second integration phase. The methods may for example be implemented by providing control signals to switches such as APC switches, transfer gates, etc.

[2FD Anti-Parallel Connection (APC) Based Common Mode Rejection (CMR) Circuit]

FIG. 1 schematically shows, as a first embodiment, a 2FD APC based CMR circuit 101. The 2FD topology 101 includes at the top side, a DC reference voltage VREF, two reference control signals VREFCONA, VREFCONB, and four reference input switches 103, 104, 105, 106. Two capacitors CAPA, CAPB are provided to integrate current. The capacitors CAPA, CAPB are part of an APC circuitry 102. The APC circuitry 102 comprises four switches 107, 108, 109, 110. Switch 107 receives a control signal CHA, and switch 108 receives a control signal CHB. Each switch 109, 110 receives a common control signal APC. By turning on and off the switches 103, 104, 105, 106, 107, 108, 109, 110 it is possible to control whether the integration at the capacitors CAPA, CAPB is done "from top side to bottom side" or otherwise. To read out the output signal source followers 111, 112 are provided at each output of the circuit which amplifies the output signal. A voltage VDD supplies source followers 111, 112. Readout circuitry 115, 116 is provided for reading out the signal produced by source followers 111, 112. Two floating diffusions FDA, FDB are located at the bottom side of the circuit. Transfer gates 113, 114 are provided to transfer current from the floating diffusions FDA, FDB to the capacitors CAPA, CAPB. The transfer gates 113, 114 are controlled by respective control signals TXGA, TXGB. The control signals TXGA, TXGB, VREFCONA, VREFCONB, APC, CHA, and CHB are described in more detail below with regard to FIG. 2. The circuitry is configured to integrate charge collected by the two floating diffusions FDA, FDB on the capacitors CAPA, CAPB, and to change the direction of charge integration from a first current flow ("from top side to bottom side") direction to a second current flow direction ("from bottom side to top side") between a first integration phase and a second integration phase. In particular, the circuitry is configured to connect, in a first integration phase, the first side of the capacitors CAPA, CAPB to the floating diffusions FDA, FDB, and the second side of the at least one capacitor to a reference voltage VREF, and to connect, in a second integration phase, the second side of the capacitors CAPA, CAPB to the floating diffusions FDA, FDB and the first side of the capacitors to a reference voltage VREF.

Figure 2A:
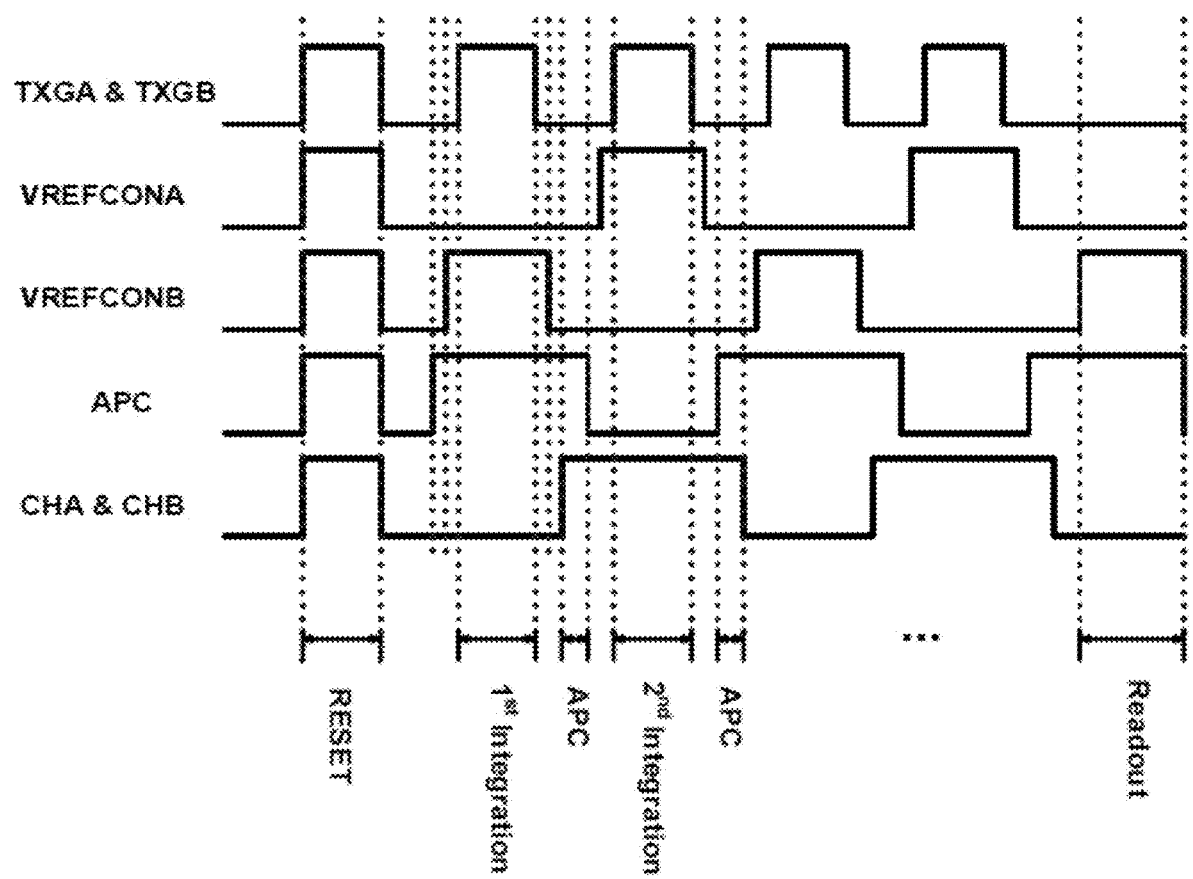
FIG. 2a is a CLK diagram of a 2FD APC based CMR circuit with APC phase.

FIG. 2a shows an example of a method of controlling the 2FD APC based CMR circuit 101 described in FIG. 1. Control signals (e.g. clock signals CLK) TXGA, TXGB, VREFCONA, VREFCONB, APC, CHA, CHB for controlling the CMR circuit are described in more detail below.

During a reset phase, all the nodes are reset to reference voltage VREF by turning on all control signals TXGA, TXGB, VREFCONA, VREFCONB, APC, CHA, CHB, i.e. the switches or transfer gates described in FIG. 1 that are related to these control signals.

During a first integration phase, TXGA, TXGB, VREFCONB, and APC are driven high whereas VREFCONA, CHA and CHB are driven low, so that the top sides of the capacitors (CAPA, CAPB in FIG. 1) are connected to FDA and FDB respectively while the bottom sides of the capacitors are connected to VREF, i.e. the currents are integrated on the bottom sides of the capacitors CAPA, CAPB. The first integration phase is followed by an APC phase in which the control signals APC, CHA and CHB are driven high whereas the control signals TXGA, TXGB, VREFCONA, VREFCONB are driven low so that switches 109, 110 and 107, 108 are turned on to complete the APC operation.

In a second integration phase, TXGA, TXGB VREFCONA, CHA, CHB are turned on (switches 104, 105, 107, 108, 113, 114 in FIG. 1), and APC and VREFCONB is turned off (109, 110 in FIG. 1) to connect the top side of CAPA and CAPB to the right and left branch, respectively.

A further APC phase follows the second integration phase, in which (as in the previous APC phase) the control signals APC, CHA and CHB are driven high whereas the control signals VREFCONA, VREFCONB, TXGA, TXGB are driven low so that switches 109, 110 and 107, 108 are turned/kept on to complete APC operation.

Integration and APC may be repeated even times to accumulate a large enough DM signal which is read out in the readout phase.

After multiple integrations, a readout phase follows. During the readout phase, the control signal VREFCONB and APC (switches 104, 105, 107, 108 in FIG. 1) are driven high.

In the embodiment of FIG. 2a, the control signals of the APC switches (107, 108, 109, 110 in FIG. 1) are configured to be non-overlapping clock signals to avoid charge loss. This is indicated by the dashed lines in FIG. 2a.

Figure 2B:
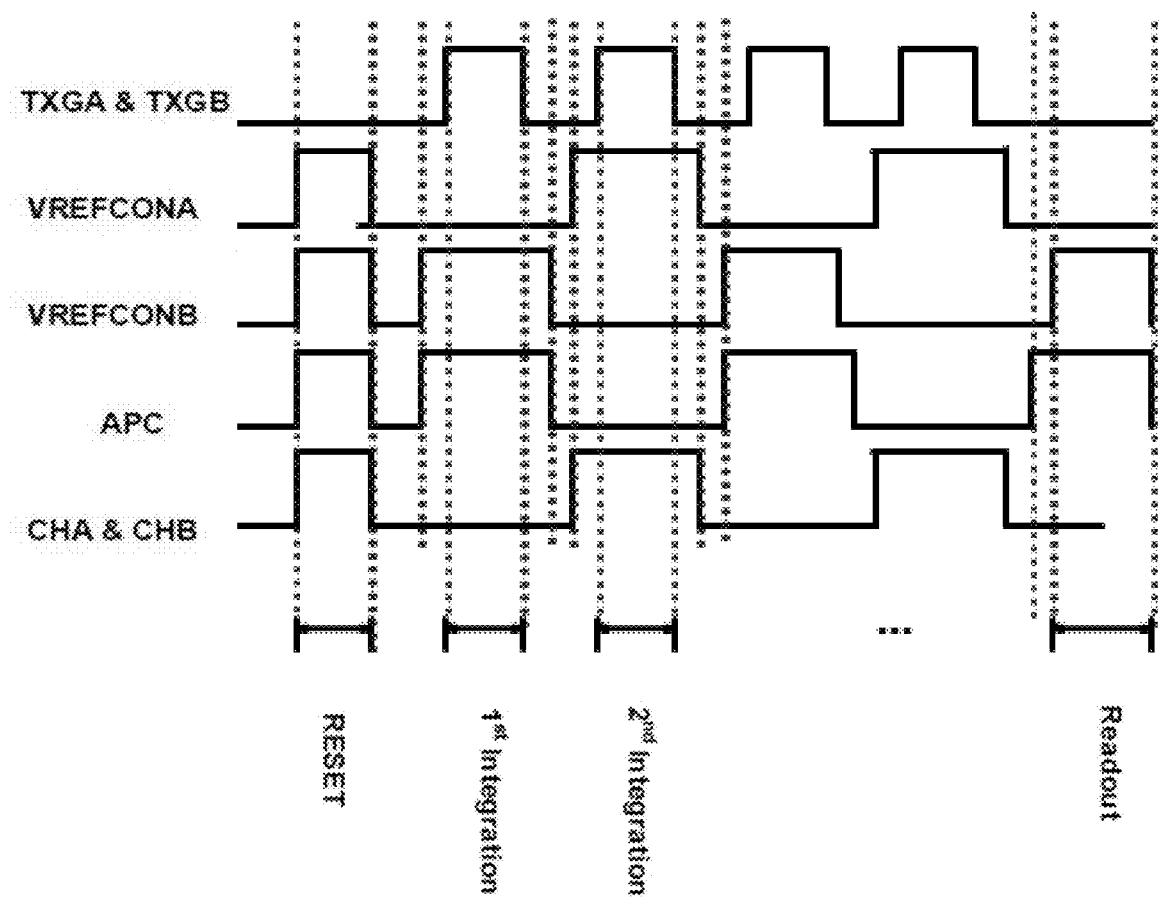
FIG. 2b is a CLK diagram of a 2FD APC based CMR circuit without APC phase.

FIG. 2b shows another example of a method of controlling the 2FD APC based CMR circuit 101 described in FIG. 1. FIG. 2b shows a modified CLK timing diagram in which the control signals VREFCONA, CHA and CHB are switched on and off together and the control signals VREFCONB, APC are switched on and off together. By changing the CLK timing diagram the APC operation can be avoided. During a reset phase, the control signals VREFCONA, VREFCONB, APC, CHA, CHB are driven high, i.e. the switches or transfer gates described in FIG. 1 that are related to these control signals are reset.

During a first integration phase, TXGA, TXGB, VREFCONB, and APC are driven high whereas VREFCONA, CHA and CHB are driven low, so that the top sides of the capacitors (CAPA, CAPB in FIG. 1) are connected to FDA and FDB respectively while the bottom sides of the capacitors are connected to VREF, i.e. the currents are integrated on the bottom sides of the capacitors CAPA, CAPB. Instead of performing an APC operation, a second integration phase is directly followed after the first integration phase.

In a second integration phase, TXGA, TXGB VREFCONA, CHA, CHB are turned on (switches 104, 105, 107, 108, 113, 114 in FIG. 1), and APC and VREFCONB is turned off (109, 110 in FIG. 1) to connect the top side of CAPA and CAPB to the right and left branch, respectively.

Integration may be repeated even times to accumulate a large enough DM signal which is read out in the readout phase.

After multiple integrations, a readout phase follows. During the readout phase, the control signal VREFCONB and APC (switches 104, 105, 107, 108 in FIG. 1) are driven high.

Figure 3:
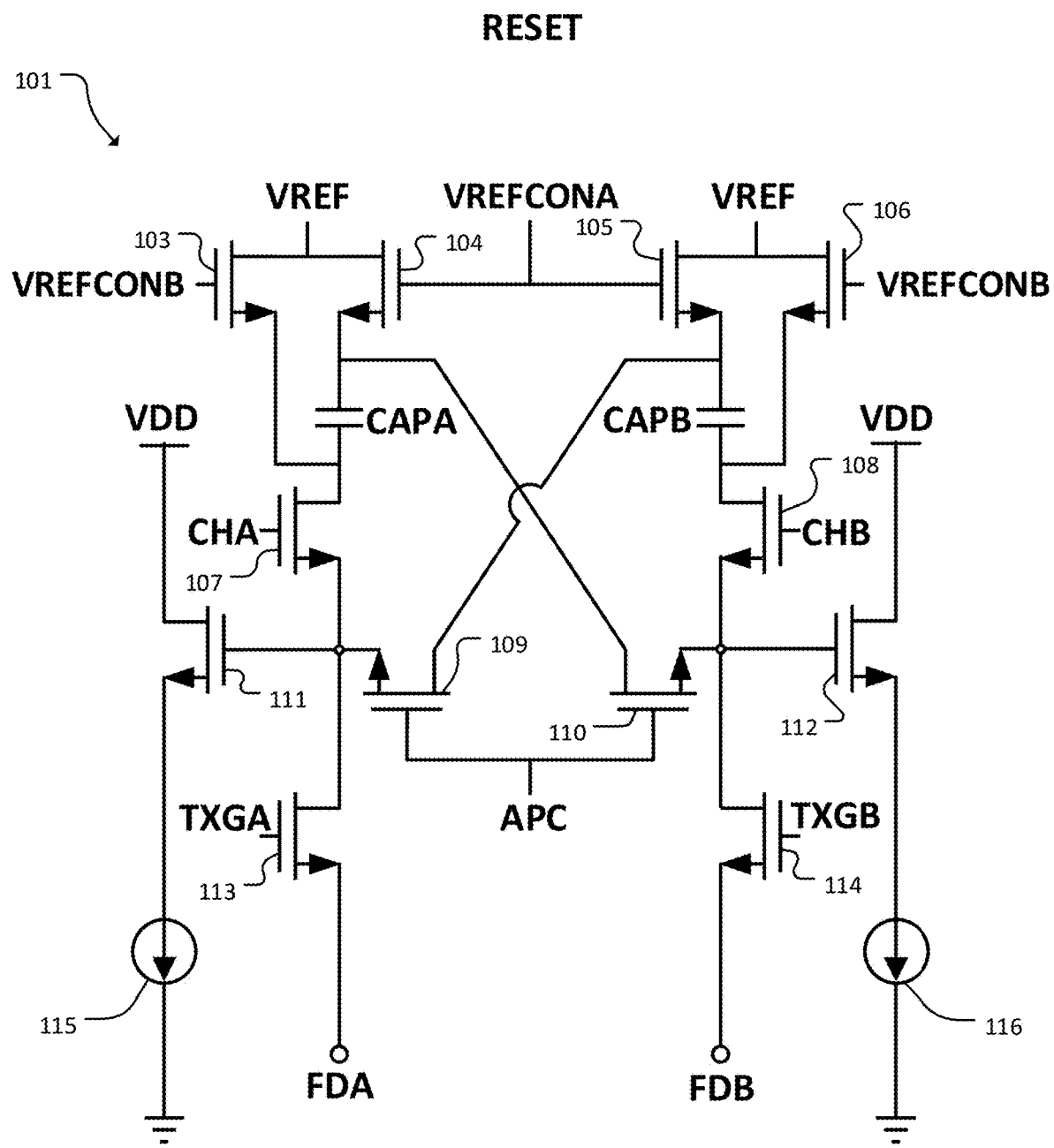
FIG. 3 is a schematic diagram of 2FD APC based CMR circuit at reset phase.

FIG. 3 shows the activated or deactivated switches in the reset phase of the above mentioned 2FD APC based CMR circuit 101. As illustrated in FIG. 3, in the reset phase, all of the switches are activated (other than e.g. in FIG. 4, there are no dashed lines in FIG. 3). Accordingly, in the reset phase, the floating diffusions are reset to the reference voltage VREF.

Figure 4:
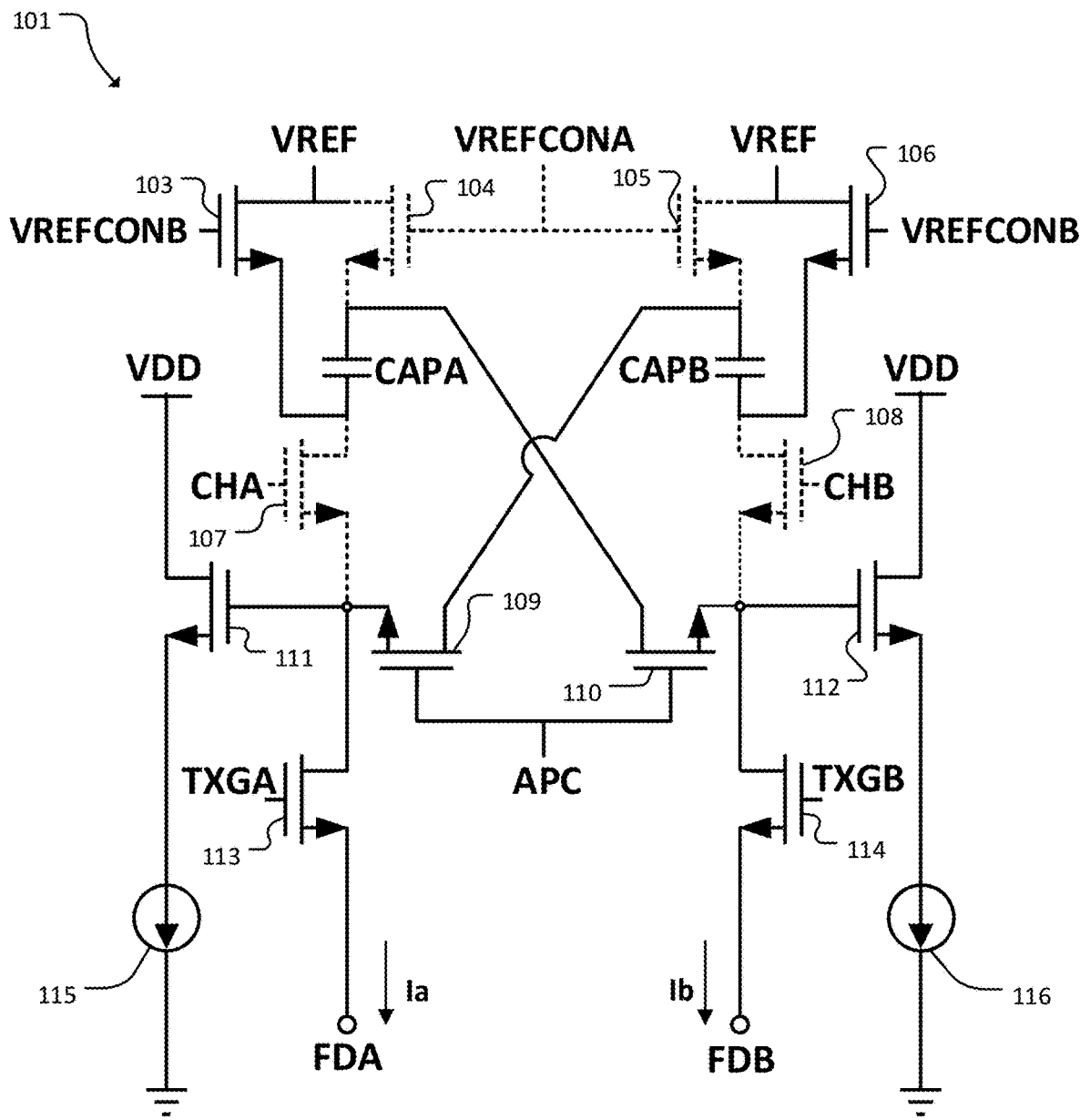
FIG. 4 is a schematic diagram of 2FD APC based CMR circuit at first integration phase.

FIG. 4 shows the activated switches (switches drawn in solid lines) and the deactivated switches (switches drawn in dashed lines) in the first integration phase of the 2FD topology 101. The dashed lines represent nodes where current is not flowing and the black lines represent the nodes where current is flowing. Further, the current flow directions are given with an arrow sign 117, 118. In the first integration phase, the bottom sides of capacitors CAPA and CAPB are connected to the reference voltage VREF and the top sides of capacitors CAPA and CAPB are connected to the floating diffusions FDB, and, respectively, FDA. It should be recognized that capacitor CAPA is connected to the right branch (floating diffusion FDB) and capacitor CAPB is connected to the left branch (floating diffusion FDA).

Figure 5:
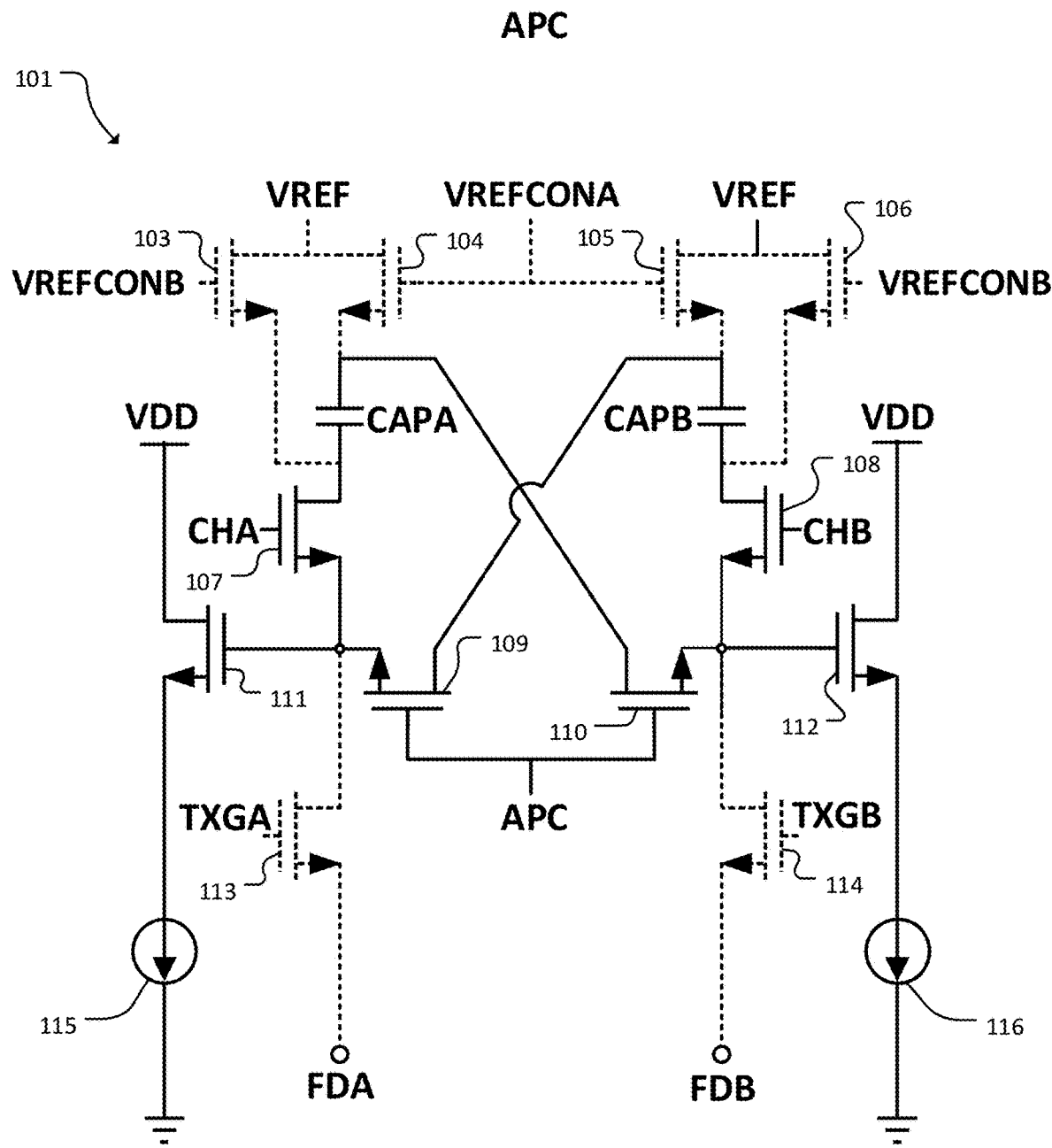
FIG. 5 is a schematic diagram of 2FD APC based CMR circuit at APC phase.

FIG. 5 shows the activated or deactivated switches in the APC phase of the 2FD topology 101. In the APC phase, the capacitors CAPA and CAPB are anti-parallel connected. The anti-parallel connection results in cancelling the common mode (CM) signal and resolves the differential mode (DM) signal.

Figure 6:
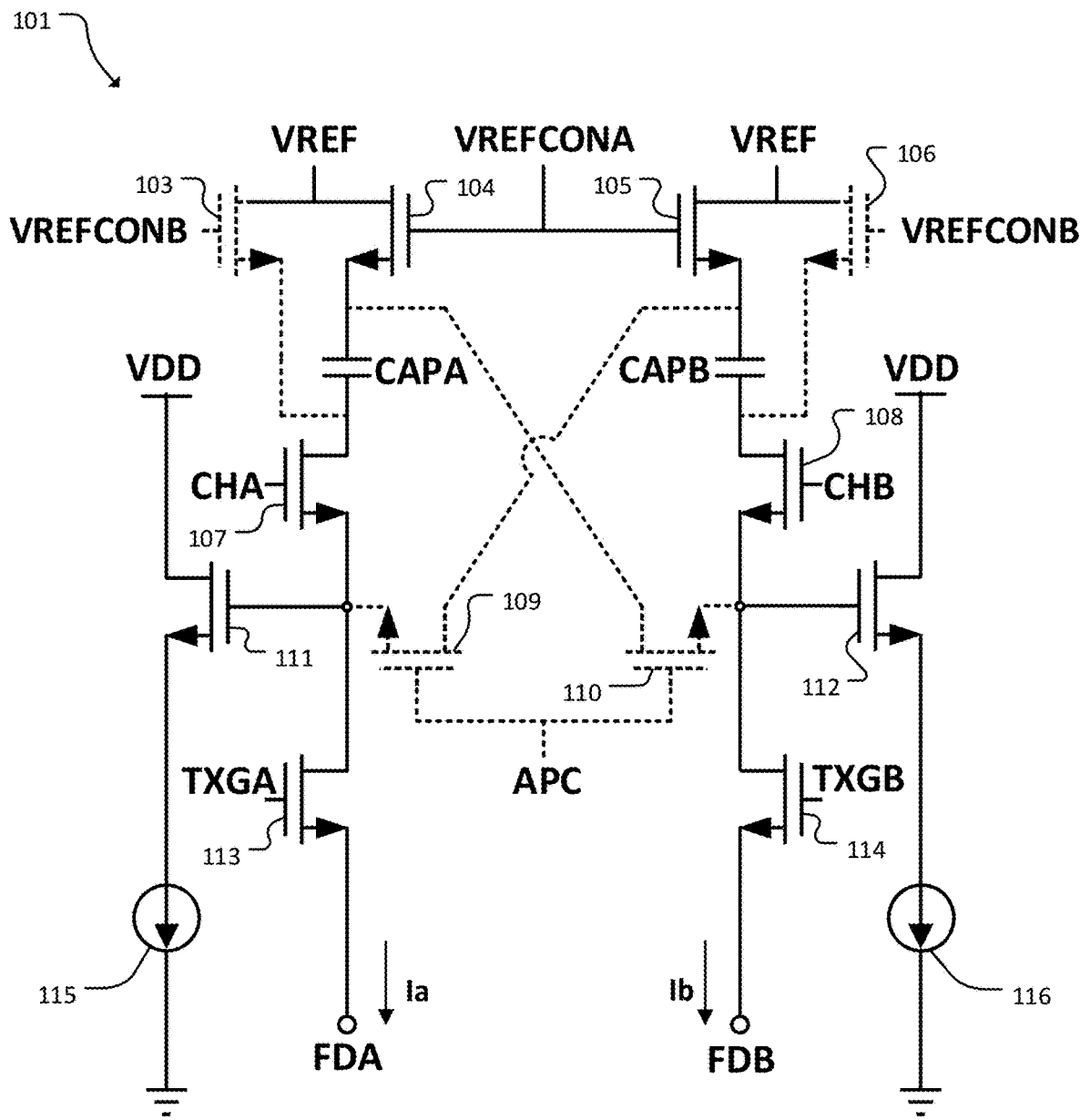
FIG. 6 is a schematic diagram of a 2FD APC based CMR circuit at second integration phase.

FIG. 6 illustrates the switch configuration in the second integration phase. In the second integration phase, the top sides of capacitors CAPA and CAPB are connected to the reference voltage VREF and the bottom sides of capacitors CAPA and CAPB are connected to the floating diffusions FDA, and, respectively, FDB. That is, in the second integration phase the current flow direction in the capacitors CAPA and CAPB is opposite to the current flow direction in the first integration phase described in FIG. 4 above.

From FIGS. 4 and 6 it can be seen that the circuity is configured to integrate, in the first integration phase (FIG. 4), charge collected by the second floating diffusion FDB on the first capacitor CAPA and charge collected by the first floating diffusion FDA on the second capacitor CAPB, and to integrate, in the second integration phase (FIG. 6), charge collected by the first floating diffusion FDA on the first capacitor CAPA and charge collected by the second floating diffusion FDB on the second capacitor CAPB.

Figure 7:
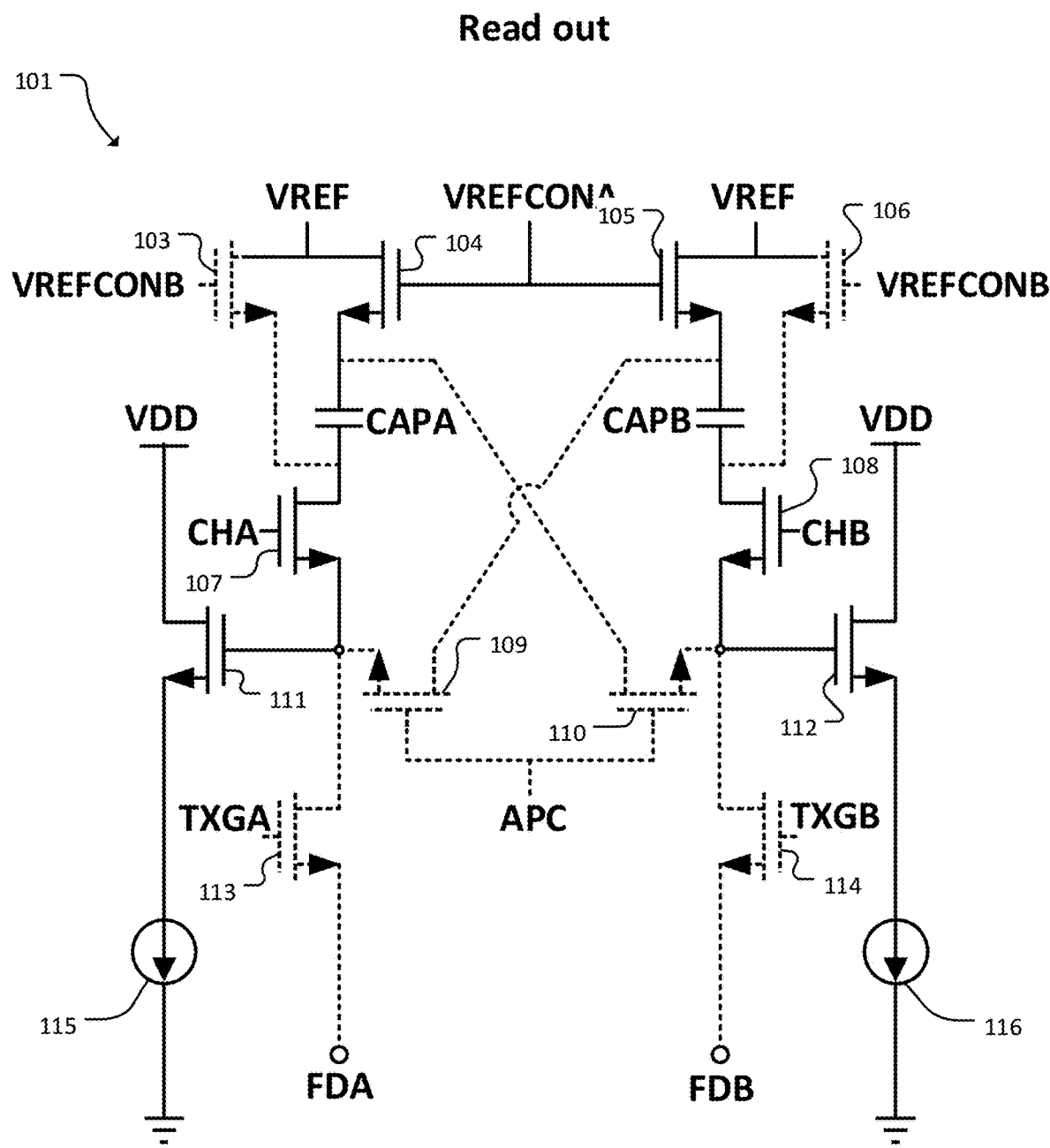
FIG. 7 is a schematic diagram of a 2FD APC based CMR circuit at readout phase.

FIG. 7 illustrates the switch configuration for the readout phase. In the readout phase, the charge at the bottom side of capacitor CAPA is provided to source follower 111, and the charge at the bottom side of capacitor CAPB is provided to source follower 112.

In an alternative embodiment, the CHA, CHB switches 107,108 can be removed if the APC operation time is small.

If one or more additional reset switches are added and all the APC circuitry (102 in FIG. 1) are turned off, the pixel can be configured into a regular structure (i.e. without additional APC circuitry). This may offer a dual conversion gain characteristic to deal with outdoor applications and indoor applications, alternatively.

Figure 8:
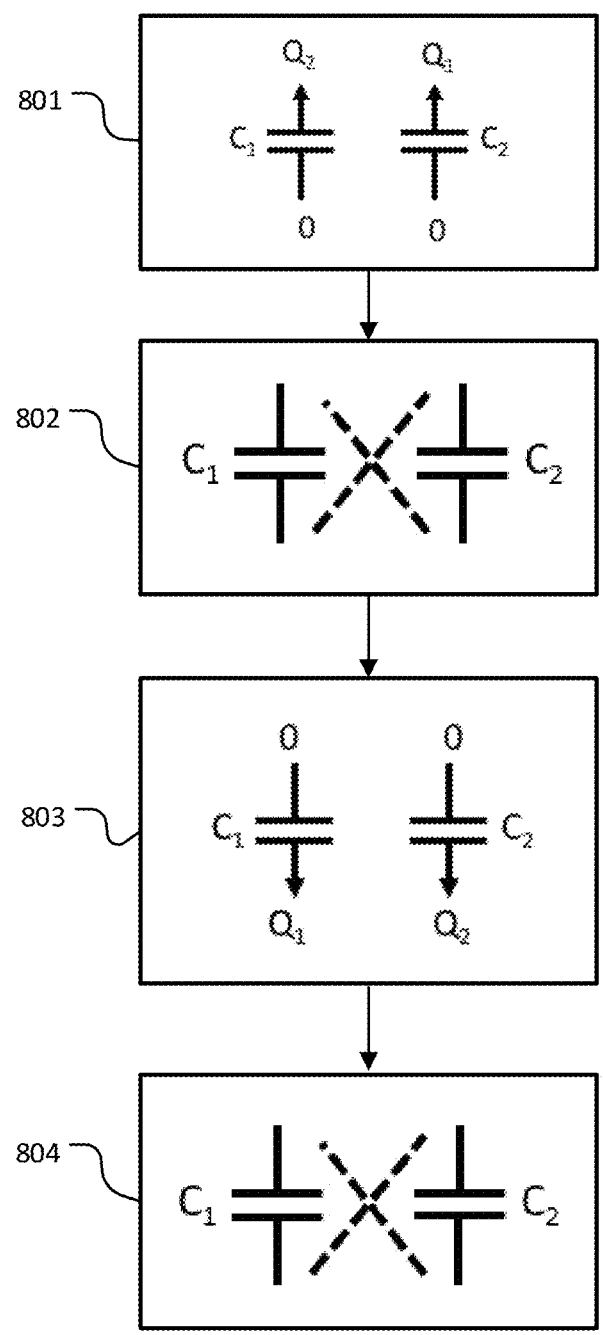
FIG. 8 schematically describes a principle of APC based CMR Operation of the capacitors.

FIG. 8 shows a schematic description of the operation principle of the embodiment of FIG. 1 to FIG. 7, where multi-integrations are done subsequently with different current flow directions and phases. At 801, the current in the two capacitors (CAPA, CAPB in FIG. 1) is integrated (see "1$^{st}$ integration" in FIG. 2). The equation below describes how charge is accumulated by reserving the current direction. The current flow is from bottom to top.

The mathematical derivation after the first integration is:

$$\Delta V_1 = -\frac{Q_2}{C_1}$$

$$\Delta V_2 = -\frac{Q_1}{C_2}$$

where $C_1$ and $C_2$ are the capacitance of the capacitor CAPA and, respectively, CAPB (see FIG. 1), $Q_1$ and $Q_2$ are the positive or negative charges on each capacitor CAPA, CAPB, and $\Delta V_1$ and $\Delta V_2$ are the voltages induced by charges $Q_1$ and $Q_2$ at the capacitors CAPA and, respectively, CAPB.

At 802, after the first integration, the capacitors CAPA, CAPB are anti-parallel connected (see first "APC phase" in FIG. 2). By anti-parallel connecting the capacitors CAPA, CAPB the sign of the signal stored in the capacitor CAPB is changed and it leads to the subtraction of the two stored signals. The anti-parallel connection results in cancelling the common mode (CM) signal and resolves the differential mode (DM) signal. The mathematical derivation after the first anti-parallel connection phase is given below, wherein $\Delta V'$ is a differential voltage between the integrated voltages which is obtained during the first integration phase.

$$-\frac{Q_2}{C_1} \times C_1 + \frac{Q_1}{C_2} \times C_2 = \Delta V' \times (C_1 + C_2) \to \Delta V' = \frac{Q_1 - Q_2}{C_1 + C_2}$$

At 803, a second integration is done (see "$2^{nd}$ integration" in FIG. 2), where the current flow is from the top side to the bottom side of the capacitors with a second phase. The mathematical derivation after the second integration is:

$$\Delta V'_1 = \frac{+\Delta V' \times C_1 + Q_2}{C_1} = \frac{Q_1 - Q_2}{C_1 + C_2} - \frac{Q_2}{C_1}$$

$$\Delta V'_2 = \frac{-\Delta V' \times C_1 + Q_1}{C_2} = \frac{Q_1 - Q_2}{C_1 + C_2} - \frac{Q_1}{C_2}$$

$\Delta V'_1$ and $\Delta V'_2$ are the differential voltages of the voltage $\Delta V'$ and the voltages induced by charges $Q_2$ and $Q_1$ at the capacitors CAPA and, respectively, CAPB.

At 804, the capacitors CAPA, CAPB are again anti-parallel connected (see second "APC phase" in FIG. 2). The mathematical derivation after the second anti-parallel phase is given below, wherein $\Delta V''$ is a differential voltage between the integrated voltages which are obtained during the second integration phase.

$$\Delta V'' = \frac{1}{C_1 + C_2}(\Delta V'_1 \times C_1 - \Delta V'_2 \times C_2) = \frac{1}{C_1 + C_2}$$

$$\left[\left(\frac{Q_1 - Q_2}{C_1 + C_2} - \frac{Q_2}{C_1}\right) \times C_1 - \left(-\frac{Q_1 - Q_2}{C_1 + C_2} - \frac{Q_1}{C_2}\right) \times C_2\right] = 2\frac{Q_1 - Q_2}{C_1 + C_2}$$

That is, after every integration, the capacitors CAPA, CAPB are anti-parallel connected. By doing so, the sign of signal stored in the capacitors CAPA, CAPB is changed and it leads to the subtraction of the two stored signals which is exactly the operation of cancelling the CM signal and reserving the DM signal.

By repeating the above mentioned operation for pre-defined times, the DM signal is free of mismatch effect and accumulates which can be readout until it is big enough.

[4FD Anti-Parallel Connection (APC) Based Common Mode Rejection (CMR) Circuit]

Figure 9:
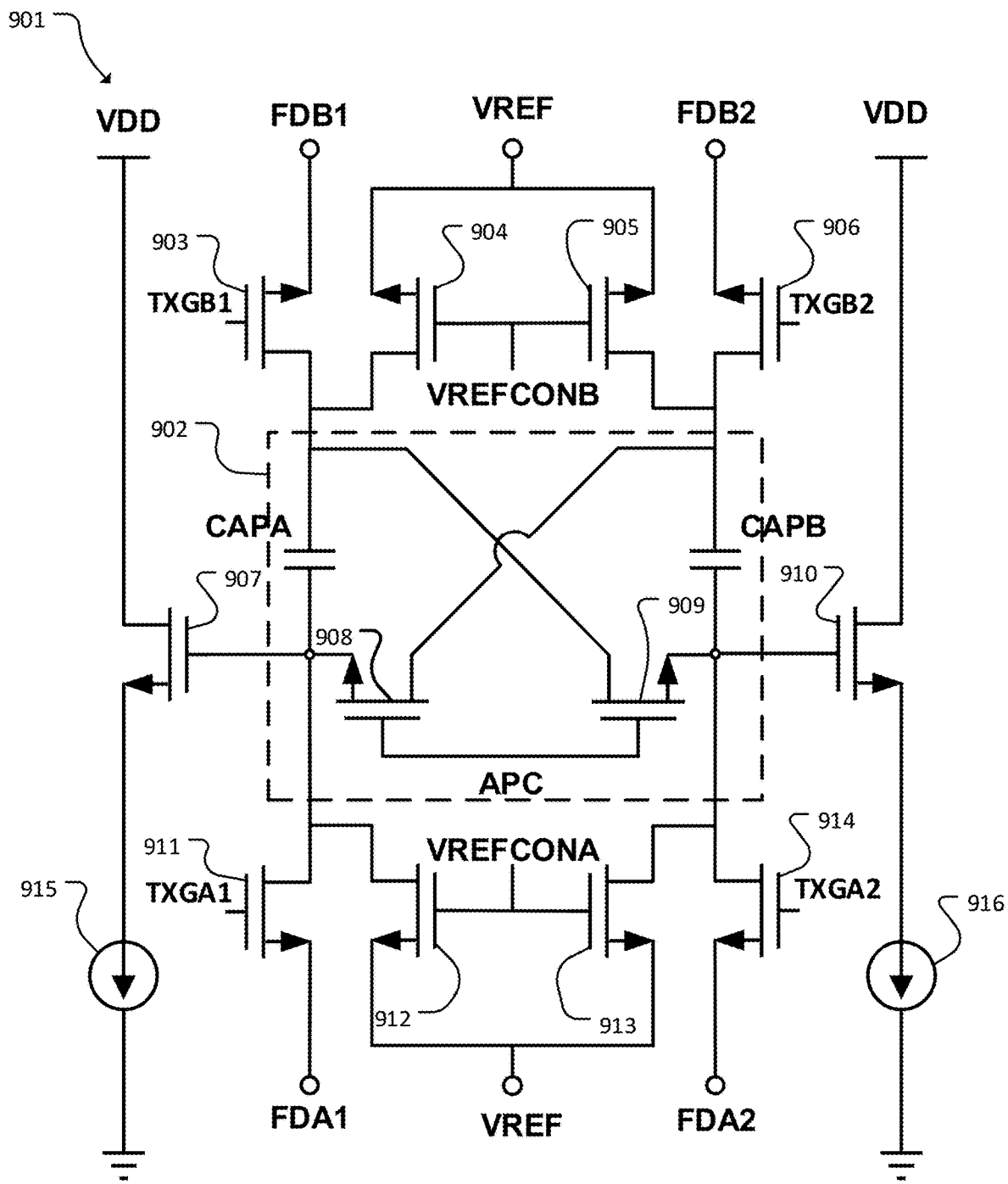
FIG. 9 is a schematic diagram of 4FD APC based CMR circuit.

FIG. 9 schematically shows, as a second embodiment, a 4FD APC based CMR circuit 901. The 4FD topology 901 includes a DC reference voltage VREF, two reference control signals VREFCONA, VREFCONB, and four reference input switches 904, 905, 912, 913. Two capacitors CAPA, CAPB are provided to integrate current. The capacitors CAPA, CAPB are part of an APC circuitry 902. The APC circuitry 902 comprises two switches 908, 909 where each of the switches 908, 909 receives a common control signal APC. By turning on and off the switches 903, 904, 905, 906, 908, 909, 911, 912, 913, 914, it is possible to control whether the integration at the capacitors CAPA, CAPB is done "from top side to bottom side" or otherwise.

To read out the output signal, source followers 907, 910 which amplify the output signal are provided at each output of the circuit. A voltage VDD supplies source followers 111, 112. Four FDs FDB1, FDB2, and FDA1, FDA2, are located at the top side and bottom side of the circuit respectively. Transfer gates 903, 906, 911, 914 are provided to transfer current from the floating diffusions FDB1, FDB2, FDA1, FDA2 to the capacitors CAPA, CAPB. The transfer gates 903, 906, 911, 914 are controlled by respective control signals TXGB1, TXGB2, TXGA1, TXGA2. The control signals TXGA1, TXGA2, TXGB1, TXGB2, VREFCONA, VREFCONB, APC are described in more detail below with regard to FIG. 10.

Figure 10:
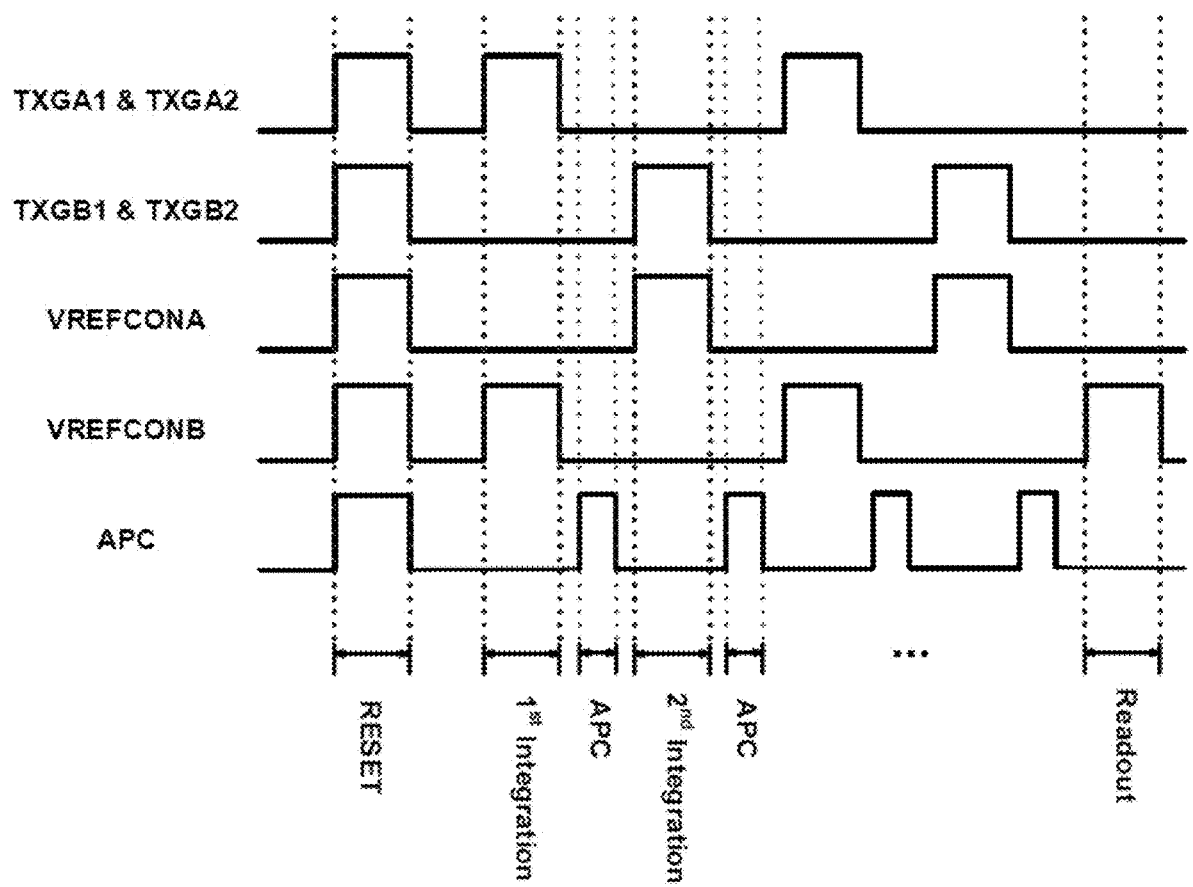
FIG. 10 is a CLK diagram of 4FD APC based CMR circuit.

FIG. 10 shows an example of a method of controlling the 4FD APC based CMR circuit 901 described in FIG. 9.

During a reset phase, all nodes are reset to reference voltage VREF by turning on all control signals TXGA1, TXGA2, TXGB1, TXGB2, VREFCONA, VREFCONB, APC, i.e. the switches or transfer gates described in FIG. 9 that are related to these control signals.

During a first integration phase, the control signals TXGA1, TXGA2 (switches 911, 914 in FIG. 9) and VREFCONB (switches 904, 905 in FIG. 9) are driven high whereas the control signals TXGB1, TXGB2, VREFCONA, APC (switches 903, 906, 912, 913, 908, 909 in FIG. 9) are driven low. The bottom sides of the capacitors (CAPA, CAPB in FIG. 9) are connected to the floating diffusions (FDA1, FDA2 in FIG. 9) while the top sides of the capacitors (CAPA, CAPB in FIG. 9) are connected to VREF.

The first integration phase is followed by an APC phase in which only the control signal APC (switches 908, 909 in FIG. 9) is driven high. The switches in the APC phase are non-overlapped turned on to complete the APC operation.

In a second integration phase, the control signals TXGB1, TXGB2 and VREFCONA (switches 903, 906, 912, 913 in FIG. 9) are driven high whereas the control signals VREFCONB, TXGA1, TXGA2, APC (switches 904, 905, 911, 914, 908, 909 in FIG. 9) are driven low. The top sides of the first capacitor (CAPA in FIG. 9) and the second capacitor (CAPB in FIG. 9) are connected to the third floating diffusion (FDB1 in FIG. 9) and the fourth floating diffusion (FDB2 in FIG. 9) respectively. The bottom sides of both capacitors are connected to VREF.

The second integration phase is followed by a further APC phase wherein the control signals TXGB1, TXGB2 and VREFCONA (switches 903, 906, 912, 913 in FIG. 9) are turned off.

In the operation described above the first floating diffusion (FDA1 in FIG. 9) and the fourth floating diffusion (FDB2 in FIG. 9) offer the same effective active light current while the second floating diffusion (FDA2 in FIG. 9) and the third floating diffusion (FDB1 in FIG. 9) offer the same currents. Integration and APC may be repeated even times to accumulate a large enough DM signal which is read out in the readout phase. At the readout phase, only the control signal VREFCONB (switches 904, 905 in FIG. 9) is driven high.

Figure 11:
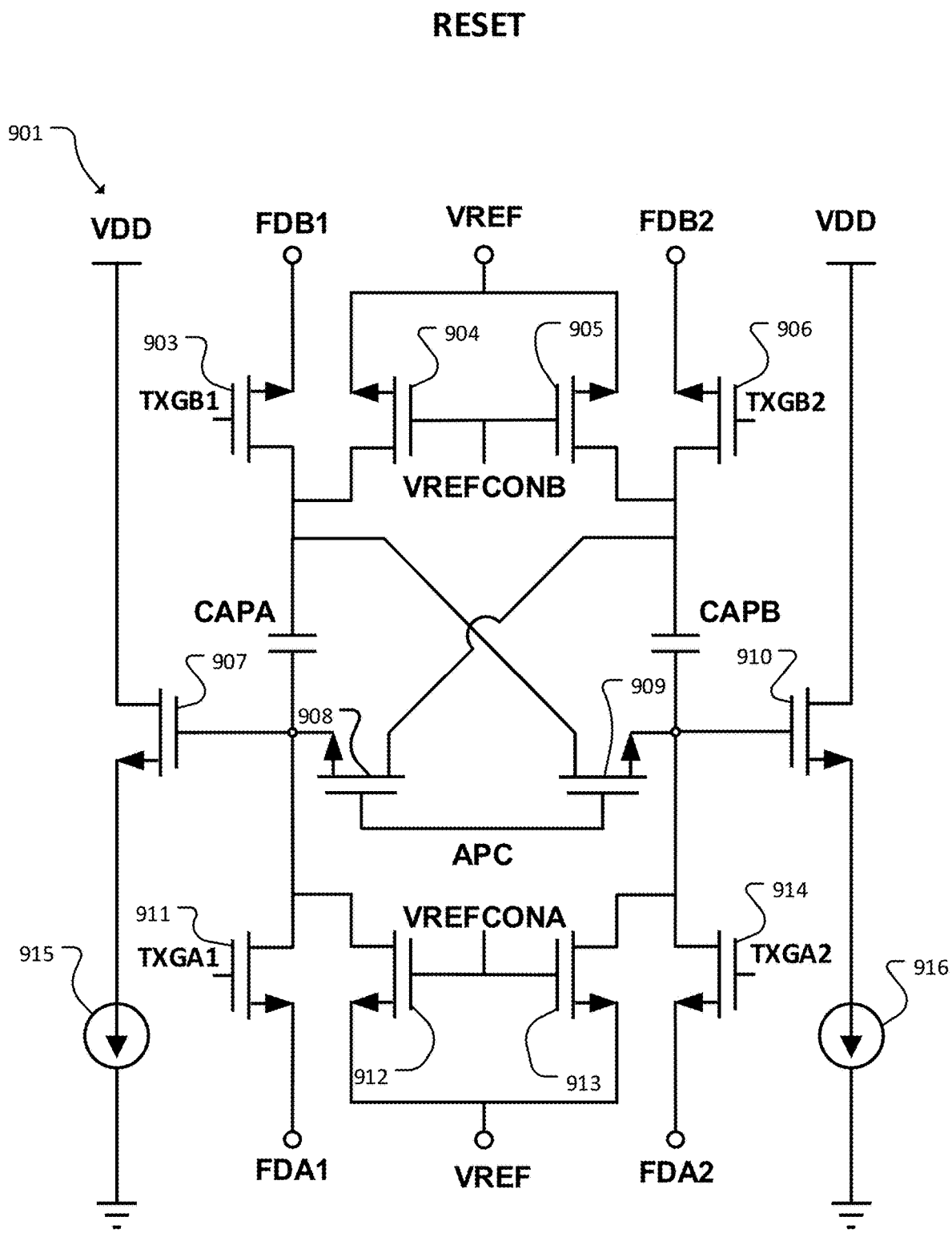
FIG. 11 is a schematic diagram of a 4FD APC based CMR circuit at reset phase.

FIG. 11 shows the configuration of activated or deactivated switches in the reset phase of the above mentioned 4FD APC based CMR circuit 901. As illustrated in FIG. 11, all of the switches are activated.

Figure 12:
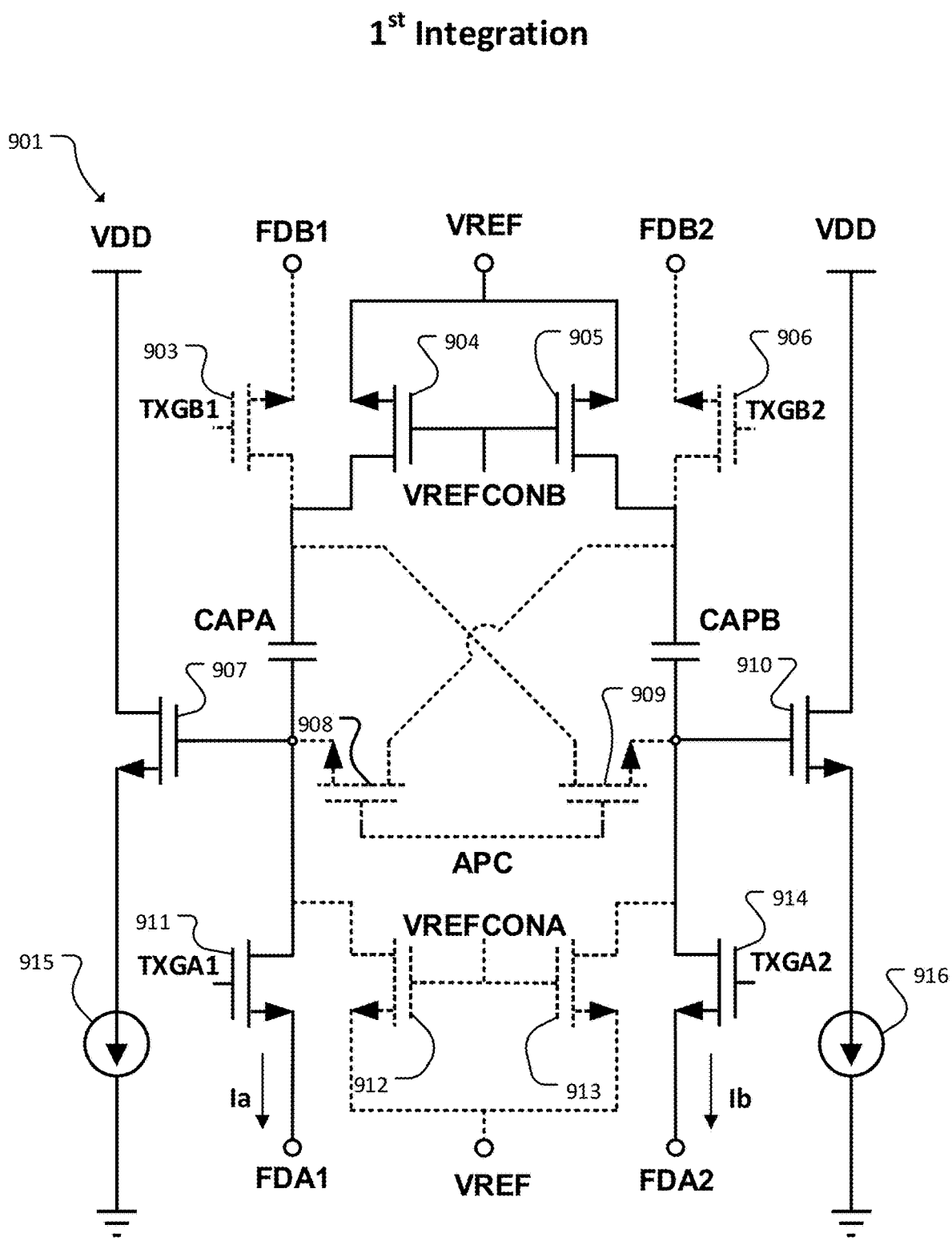
FIG. 12 is a schematic diagram of a 4FD APC based CMR circuit at first integration phase.

FIG. 12 shows the activated or deactivated switches in the first integration phase of the 4FD topology 901. The current flow directions are given with an arrow sign 917, 918.

Figure 13:
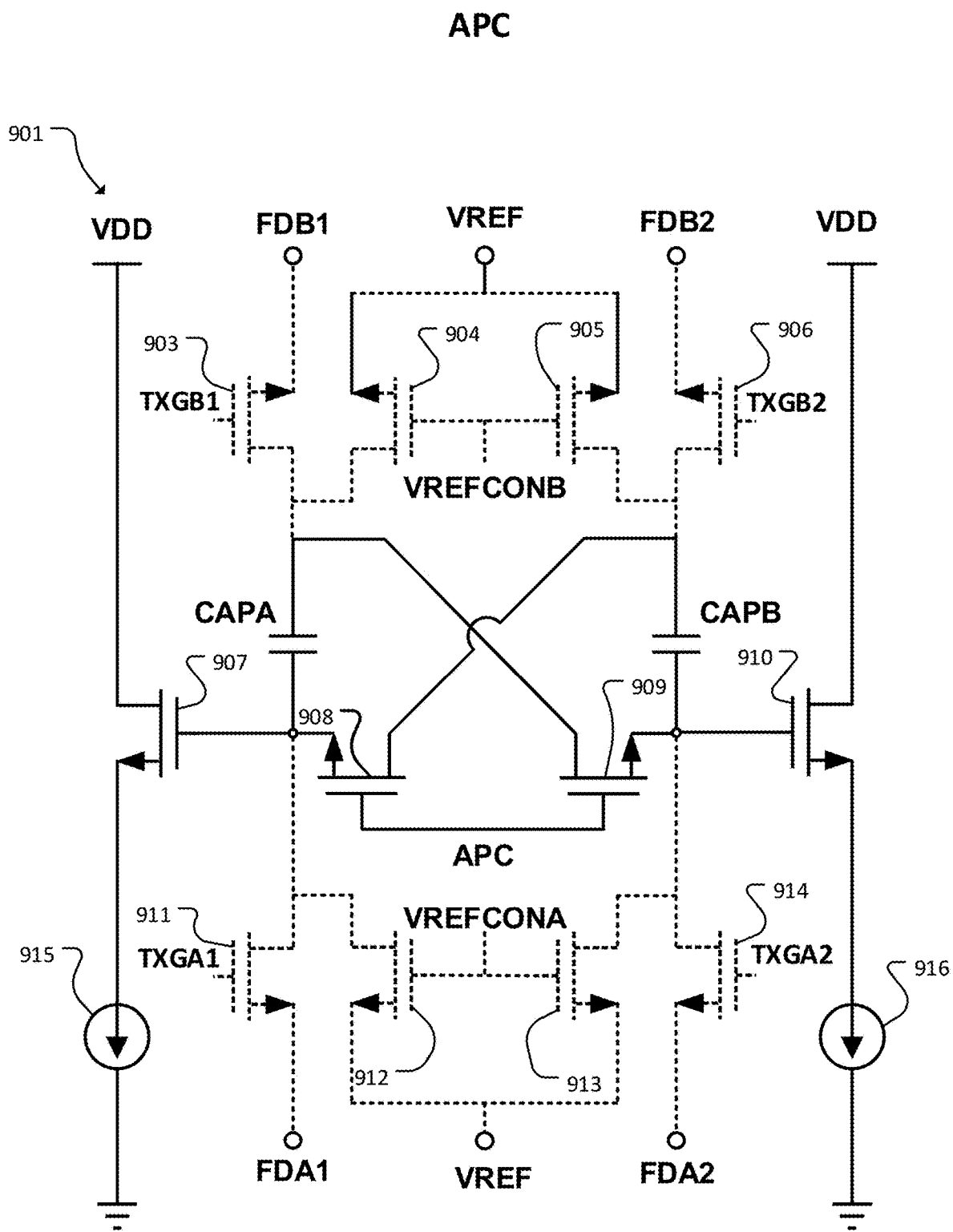
FIG. 13 is a schematic diagram of 4FD APC based CMR circuit at APC phase.

FIG. 13 shows the activated or deactivated switches in the APC phase of the 4FD topology 901.

Figure 14:
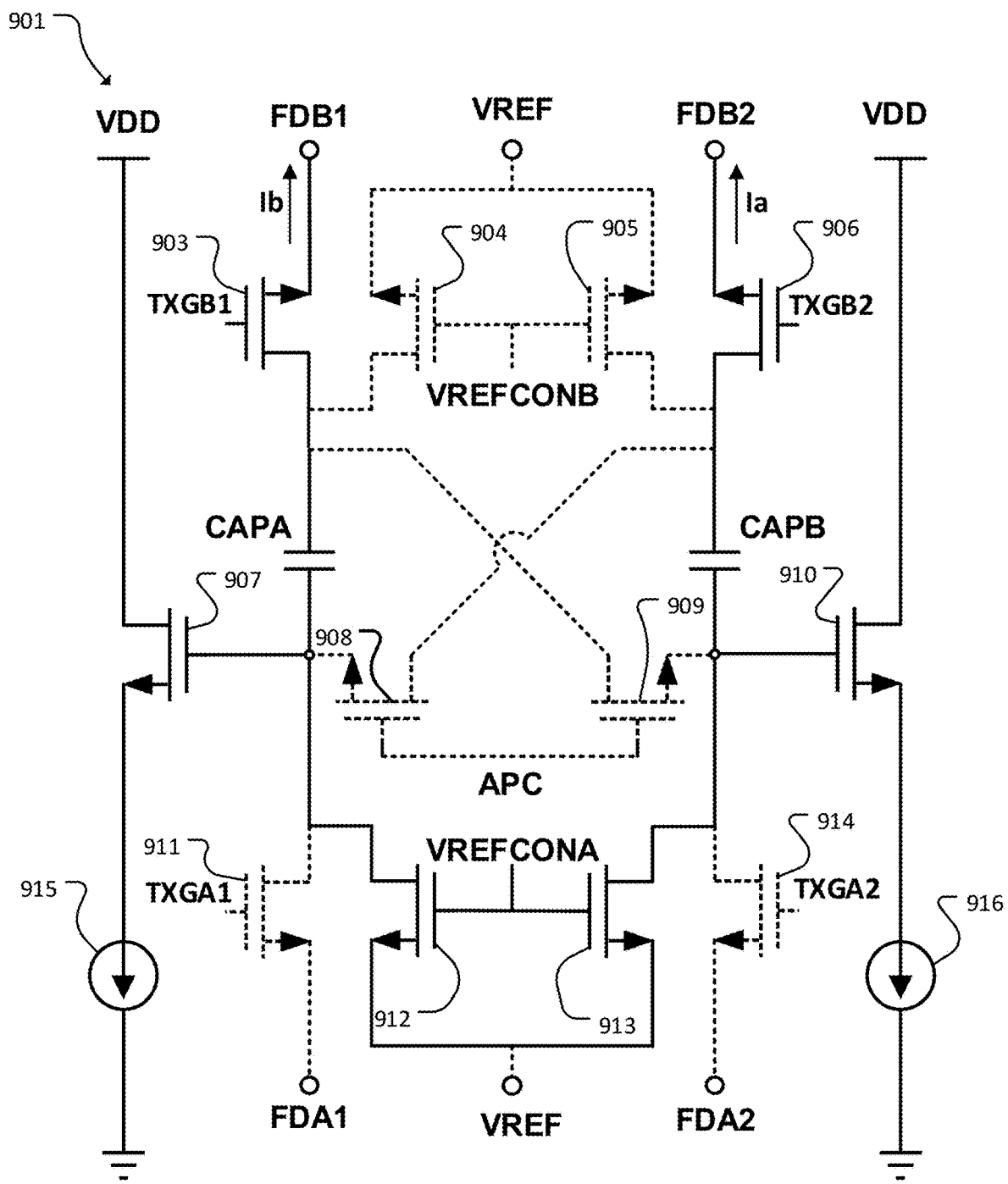
FIG. 14 is a schematic diagram of 4FD APC based CMR circuit at second integration phase.

FIG. 14 illustrate the switch configuration in the second integration phase.

Figure 15:
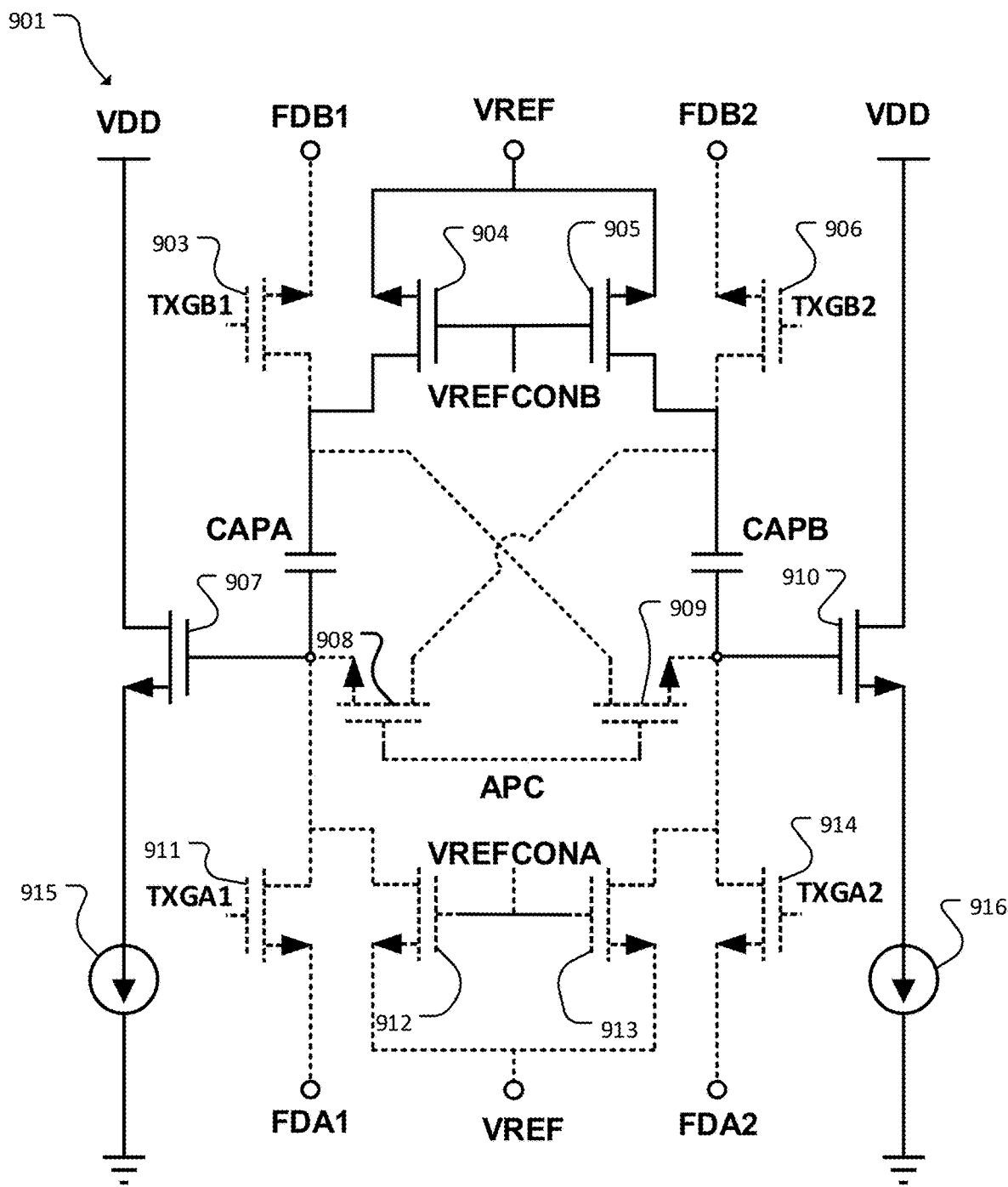
FIG. 15 is a schematic diagram of a 4FD APC based CMR circuit at readout phase.

FIG. 15 shows the switch configuration in the readout phase.

[2FD Anti-Parallel Connection (APC) Based Common Mode Rejection (CMR) Circuit without Branch Change]

Figure 16:
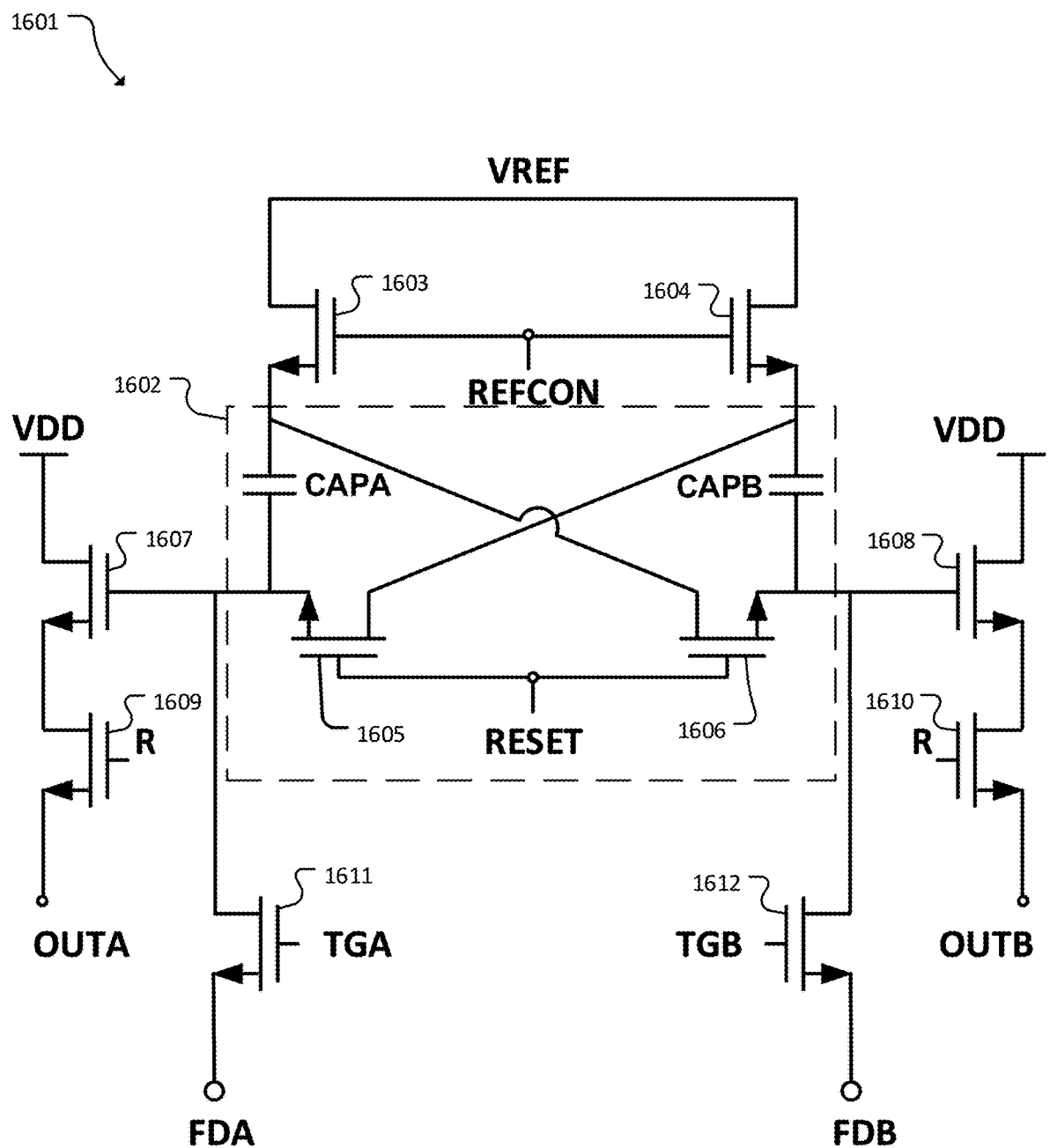
FIG. 16 is a schematic diagram of a 2FD APC based CMR circuit without branch change.

FIG. 16 schematically shows, as a third embodiment, a 2FD APC based CMR circuit 1601 without branch change. The 2FD without branch change topology 1601 includes at the top side, a DC reference voltage VREF, a reference control signal REFCON, and two reference input switches 1603, 1604. Two capacitors CAPA, CAPB are provided to integrate current. The capacitors CAPA, CAPB are part of an APC circuitry 1602. The APC circuitry 1602 comprises two switches 1605, 1606. Each switch 1605, 1606 receives a common control signal RESET. By turning on and off the switches 1603, 1604, 1605, 1606, 1611, 1612, it is possible to integrate a charge at the capacitors CAPA, CAPB or to connect the capacitors CAPA, CAPB anti-parallel to subtract charge. Two floating diffusions FDA, FDB are located at the bottom side of the circuit 1601. Transfer gates 1611, 1612 are provided to transfer current from the floating diffusions FDA, FDB to the capacitors CAPA, CAPB. The transfer gates 1611, 1612 are controlled by respective control signals TGA, TGB. To read out the integrated signal, source followers 1607, 1608 are provided at each output of the circuit which amplifies the output signal and transfer the signal to readout transfer transistors 1609, 1610.

Six control phases are used to control the 2FD APC based CMR circuit 1601 without branch change: a reset phase, a first integration phase, a first APC phase, a second integration phase, a second APC phase, and a readout phase.

In the first phase, all of the floating diffusions FDA, FDA, the transistors 1603, 1604, 16 6, 1607, 1608, 1611, 1612, and the capacitors CAPA, CAPB are reset to the reference voltage VREF. After the reset phase, the capacitors CAPA, CAPB integrate the charge of the floating diffusions FDA, FDA. The first capacitor CAPA integrates the charge of the first floating diffusion FDA and the second capacitor integrates the charge of the second floating diffusion FDB. An APC phase follows after the first integration, wherein the capacitors CAPA, CAPB are anti-parallel connected to subtract the charge which are stored in the capacitors CAPA, CAPB. The second integration phase is identical to the first integration phase. After the second integration phase, the integrated charge is subtracted once more in the second APC phase. The integration and APC phases may repeat until the differential mode signal is large enough. The accumulated signal is amplified by source followers 1670, 1608 and transferred to a readout transistors 1609, 1610 in the readout phase.

Figure 17:
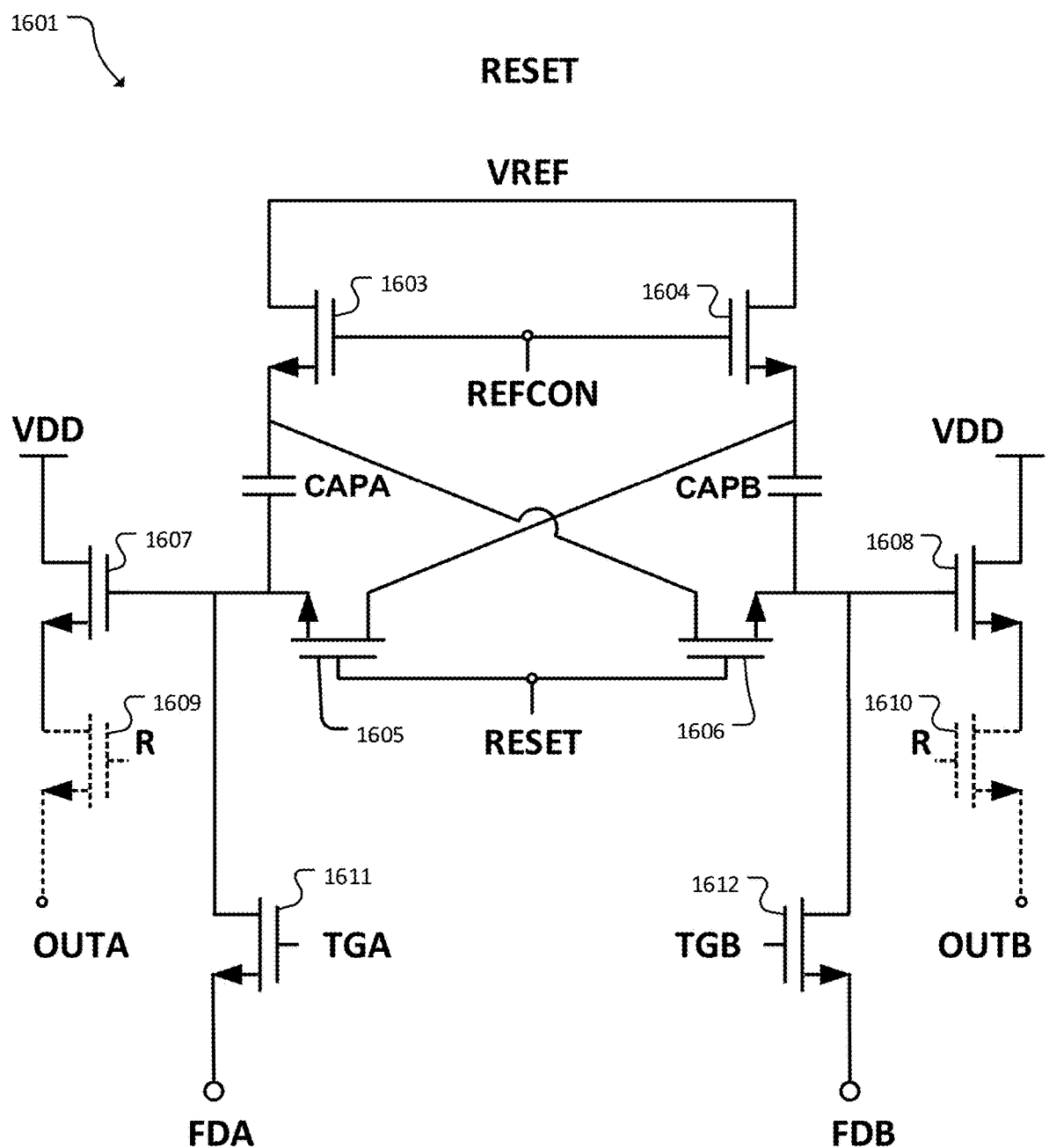
FIG. 17 is a schematic diagram of a 2FD APC based CMR circuit without branch change at reset phase.

FIG. 17 shows the activated or deactivated switches in the reset phase of the above mentioned 2FD APC based CMR circuit 1601 without branch change. As illustrated in the FIG. 17 all of the switches are activated except the readout transistors 1609, 1610.

Figure 18:
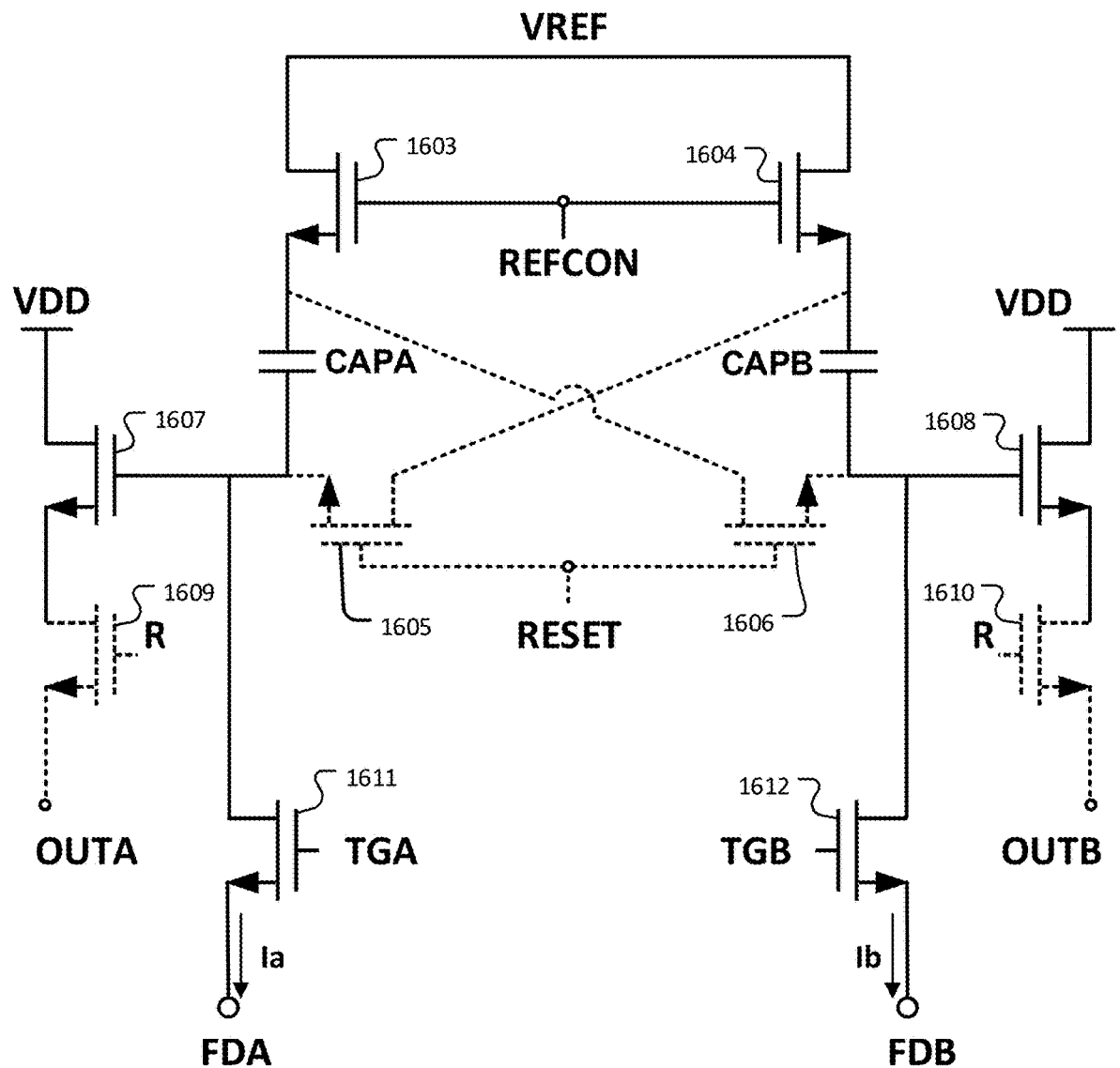
FIG. 18 is a schematic diagram of a 2FD APC based CMR circuit without branch change at first integration phase.

FIG. 18 shows the configuration of the activated or deactivated transistors in the first integration phase. The transistors 1605, 1606 from the APC circuit and the readout transistors 1609, 1610 are deactivated. Further, the current flow directions are given with an arrow sign 1613, 1614.

Figure 19:
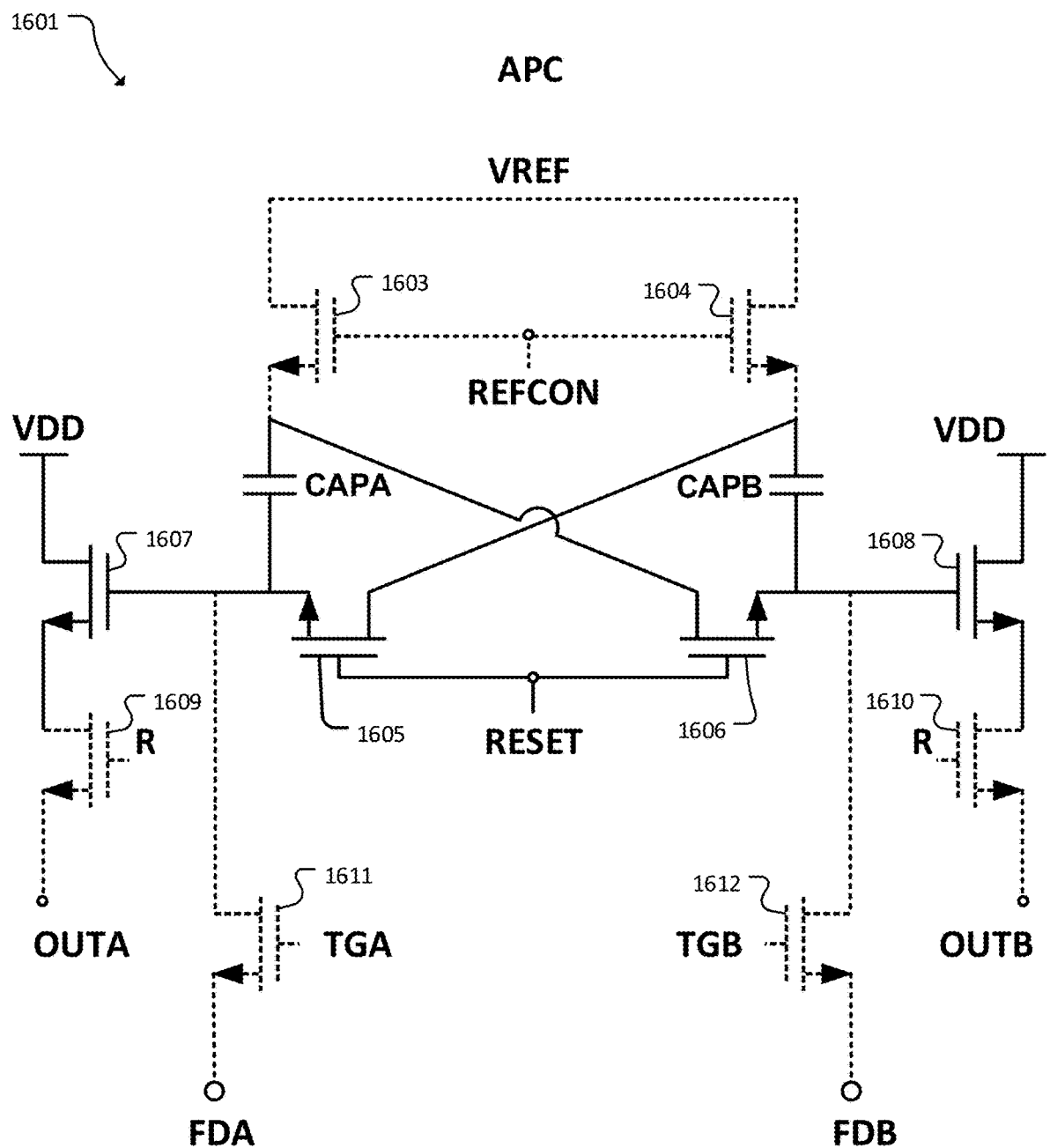
FIG. 19 is a schematic diagram of a 2FD APC based CMR circuit without branch change at APC phase.

FIG. 19 shows the activated or deactivated switches in the APC phase of the mentioned 2FD APC based CMR circuit 1601 without branch change.

Figure 20:
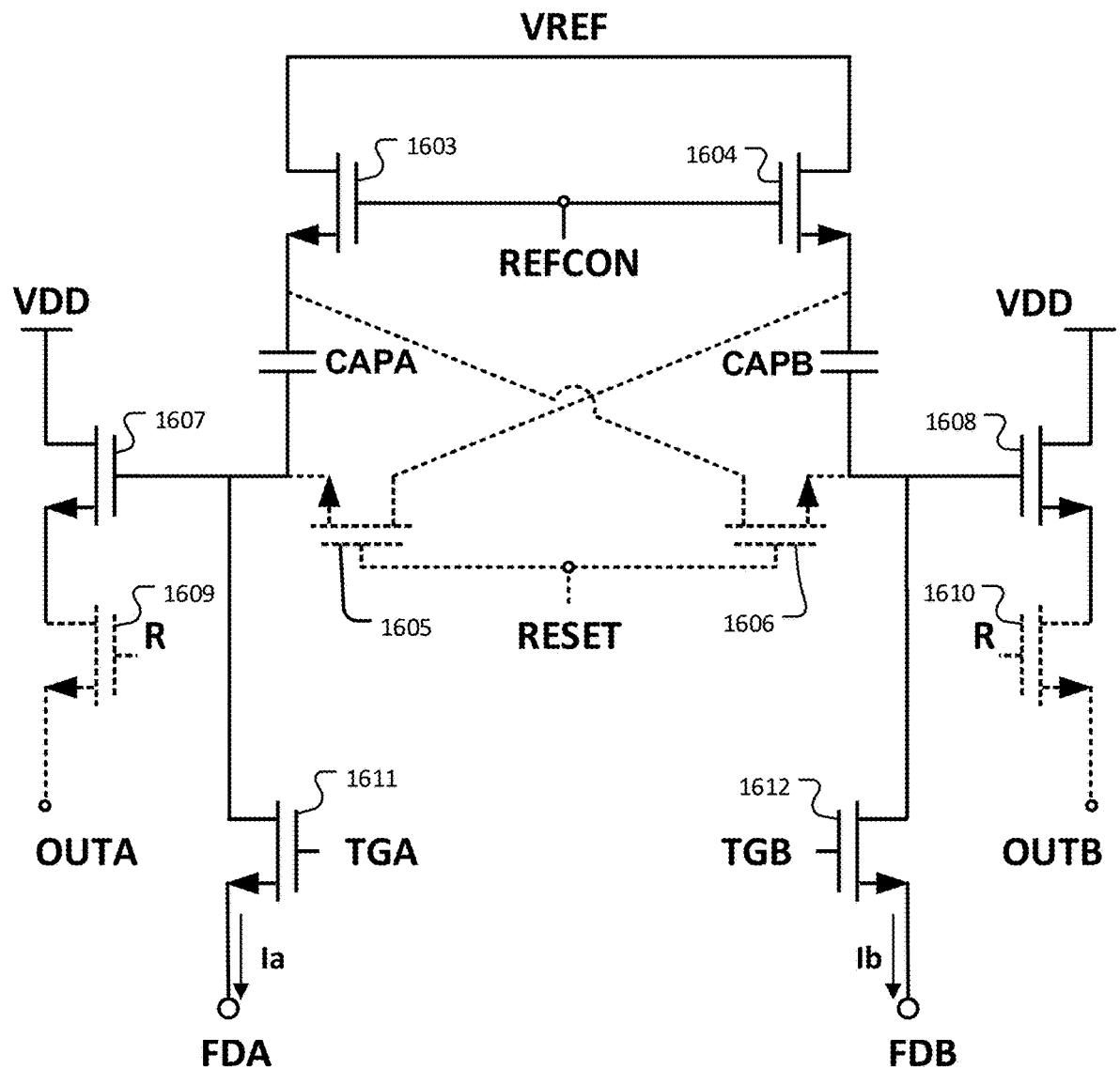
FIG. 20 is a schematic diagram of a 2FD APC based CMR circuit without branch change at second integration phase.

FIG. 20 shows the configuration of the activated or deactivated transistors in the second integration phase. The second integration phase is identical in configuration to the first integration phase displayed in FIG. 18. That is, other than in the first embodiment, each capacitor CAPA, CAPB is always connected to the same floating diffusion FDA, FDB (same branch).

Figure 21:
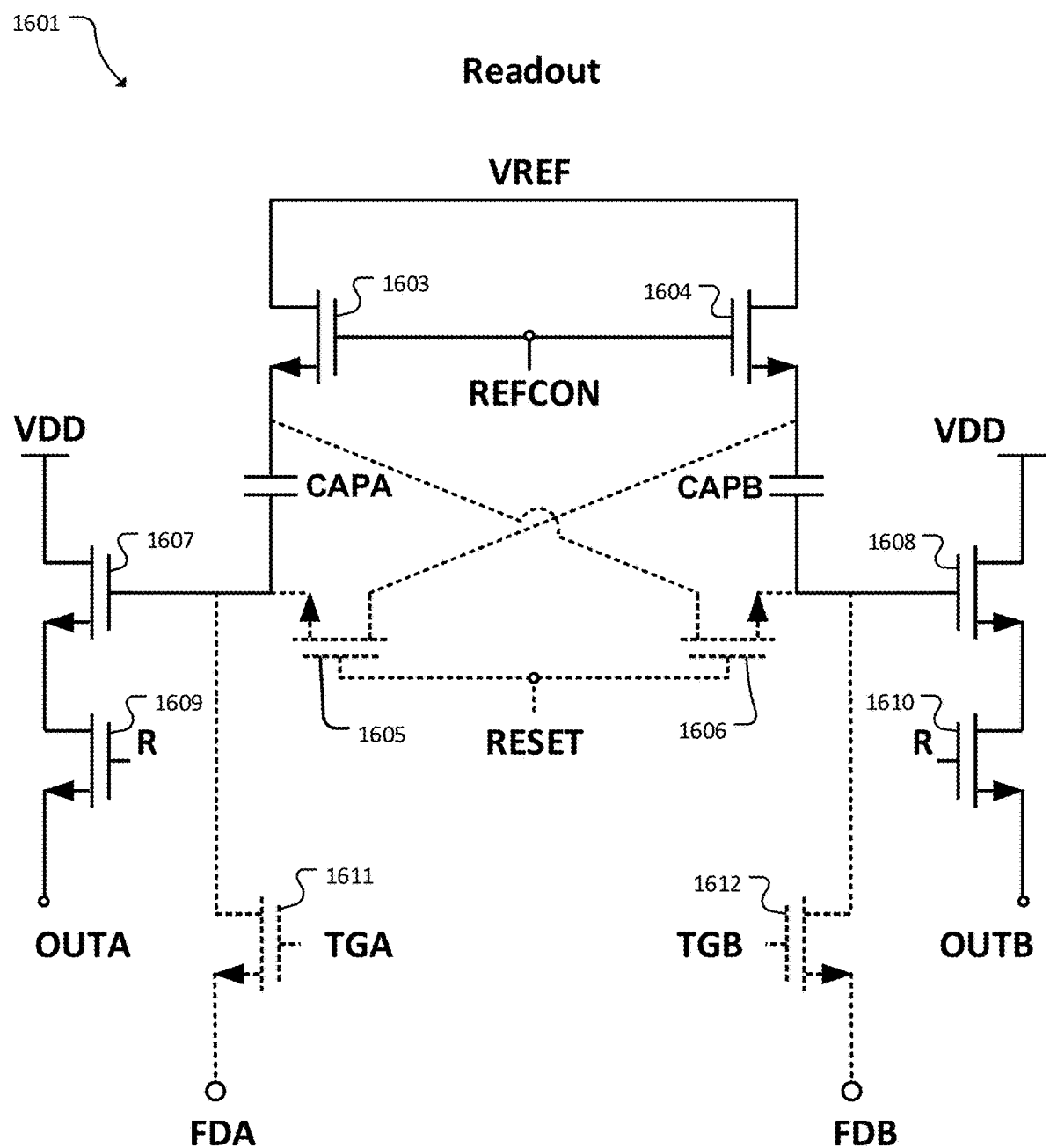
FIG. 21 is a schematic diagram of a 2FD APC based CMR circuit without branch change at readout phase.

FIG. 21 shows the configuration of the activated or deactivated transistors in the readout phase. The current flow direction is reversed as compared to the first integration phase.

[2FD Anti-Parallel Connection (APC) Based Common Mode Rejection (CMR) Circuit with Chopper Circuitry]

Figure 22:
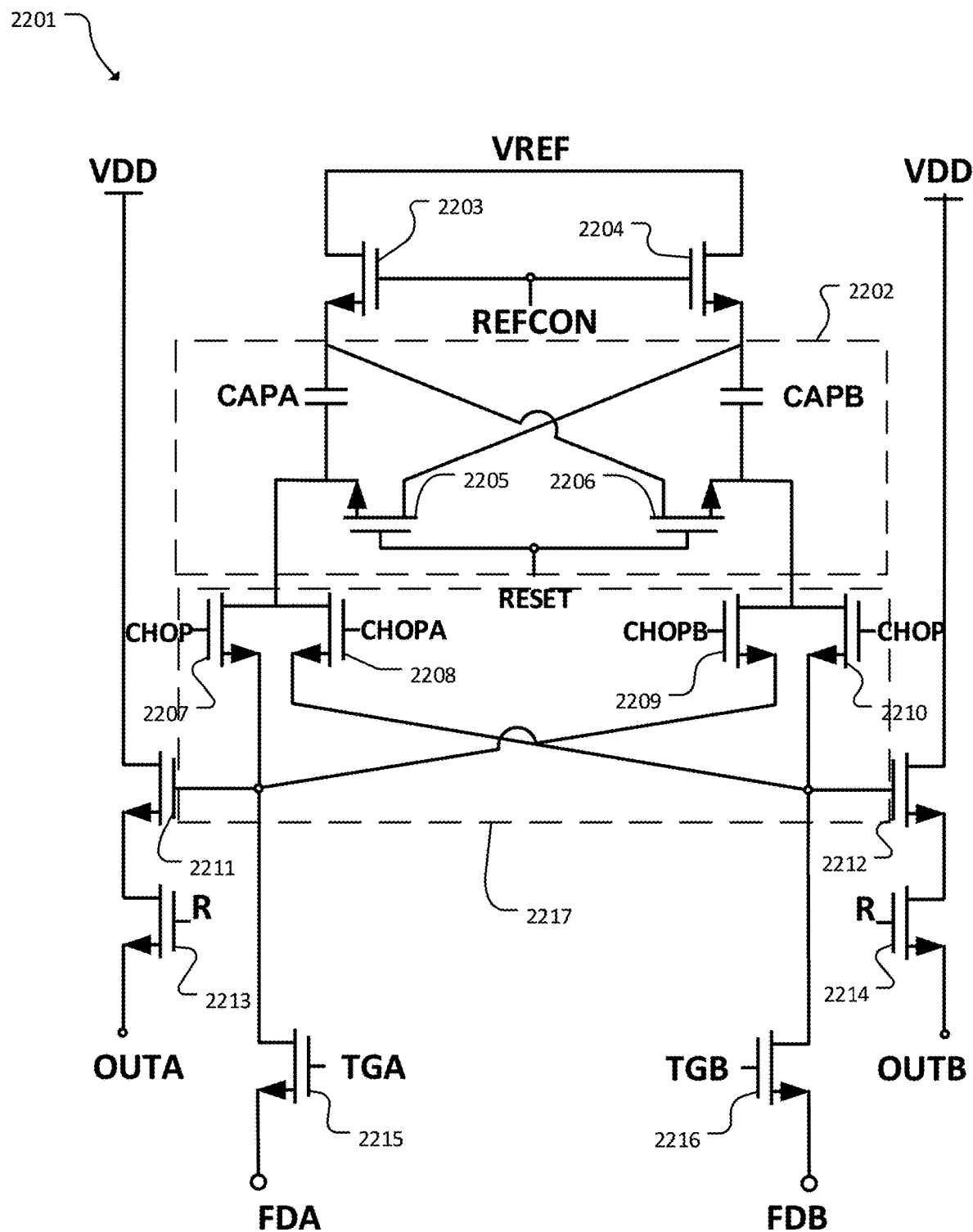
FIG. 22 is a schematic diagram of a 2FD APC based CMR circuit with chopper circuit.

FIG. 22 schematically shows, as a fourth embodiment, a 2FD APC based CMR circuit 2201 with chopper circuitry. The 2FD CMR circuit 2201 is modified by adding a chopper circuitry 2217 to the 2FD APC based CMR circuit 1601 without branch change described in the previous embodiment. The chopper circuitry 2217 is placed between an APC circuit 2202 and transfer transistors 2215, 2216. The chopper circuitry 2217 is provided to enable to change current directions in each integration phase. The chopper circuitry 2217 includes four transistors 2207, 2208, 2209, 2210, which are controlled by respective control signals CHOPA, CHOPB. In the case where the first control signal CHOPA is activated, the bottom side of the first capacitor CAPA is connected to the first floating diffusion FDA, and the bottom side of the second capacitor CAPB is connected at the second floating diffusion FDB. In the case where the control signal CHOPB is activated, the bottom side of the first capacitor CAPA is connected to the second floating diffusion FDB, and the bottom side of the second capacitor CAPB is connected to the first floating diffusion FDA.

The 2FD APC based CMR with a chopper circuit 2201 includes a reset phase, a first integration phase, a first APC phase, a second integration phase, a second APC phase, and a readout phase to control the circuit.

Figure 23:
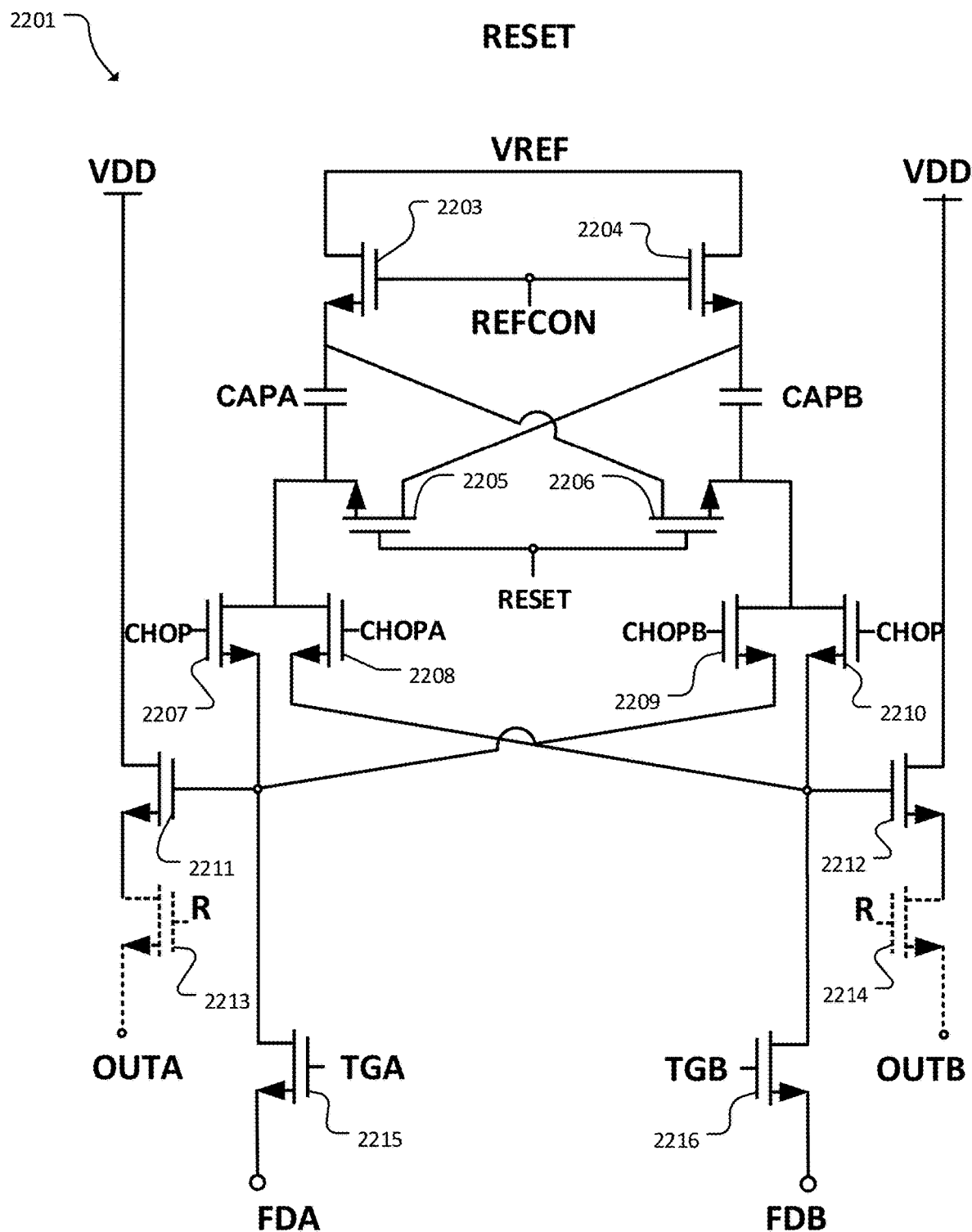
FIG. 23 is a schematic diagram of a 2FD APC based CMR circuit with chopper circuit at reset phase.

FIG. 23 shows the circuit configuration at the reset phase, where all of the transistors 2203, 2204, 2205, 2206, 2207, 2208, 2209, 2210, 2211, 2212, 2215, 2216 are activated, except the readout transistors 2213, 2214.

Figure 24:
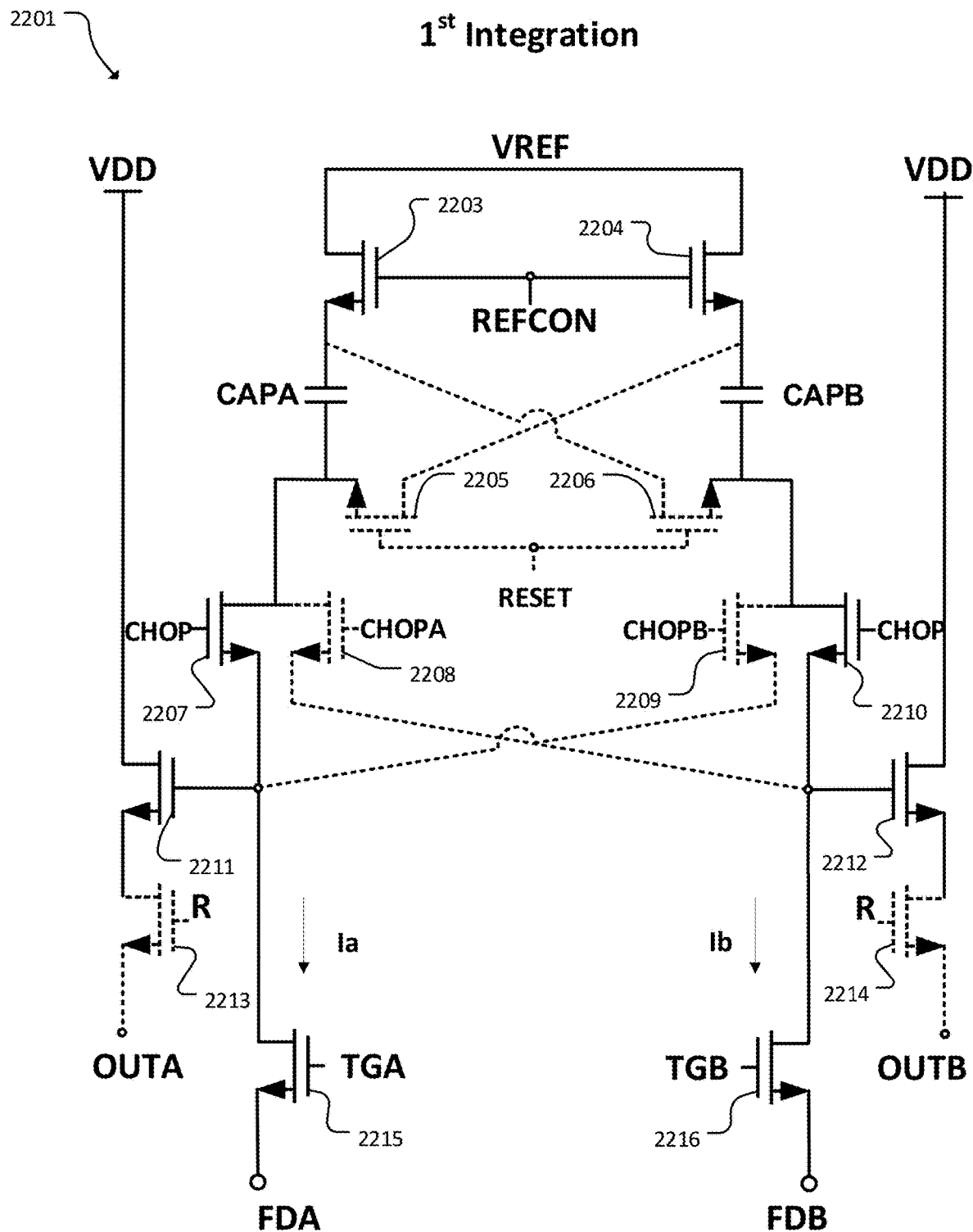
FIG. 24 is a schematic diagram of a 2FD APC based CMR circuit with chopper circuit at first integration phase.

FIG. 24 illustrates the circuit configuration in the first integration phase. The transistors 2207, 2210 which are controlled by the CHOPA signal, the transfer transistors 2215, 2216, and the reference transistors 2203, 2204 are activated. The APC circuit 2202 is deactivated.

Figure 25:
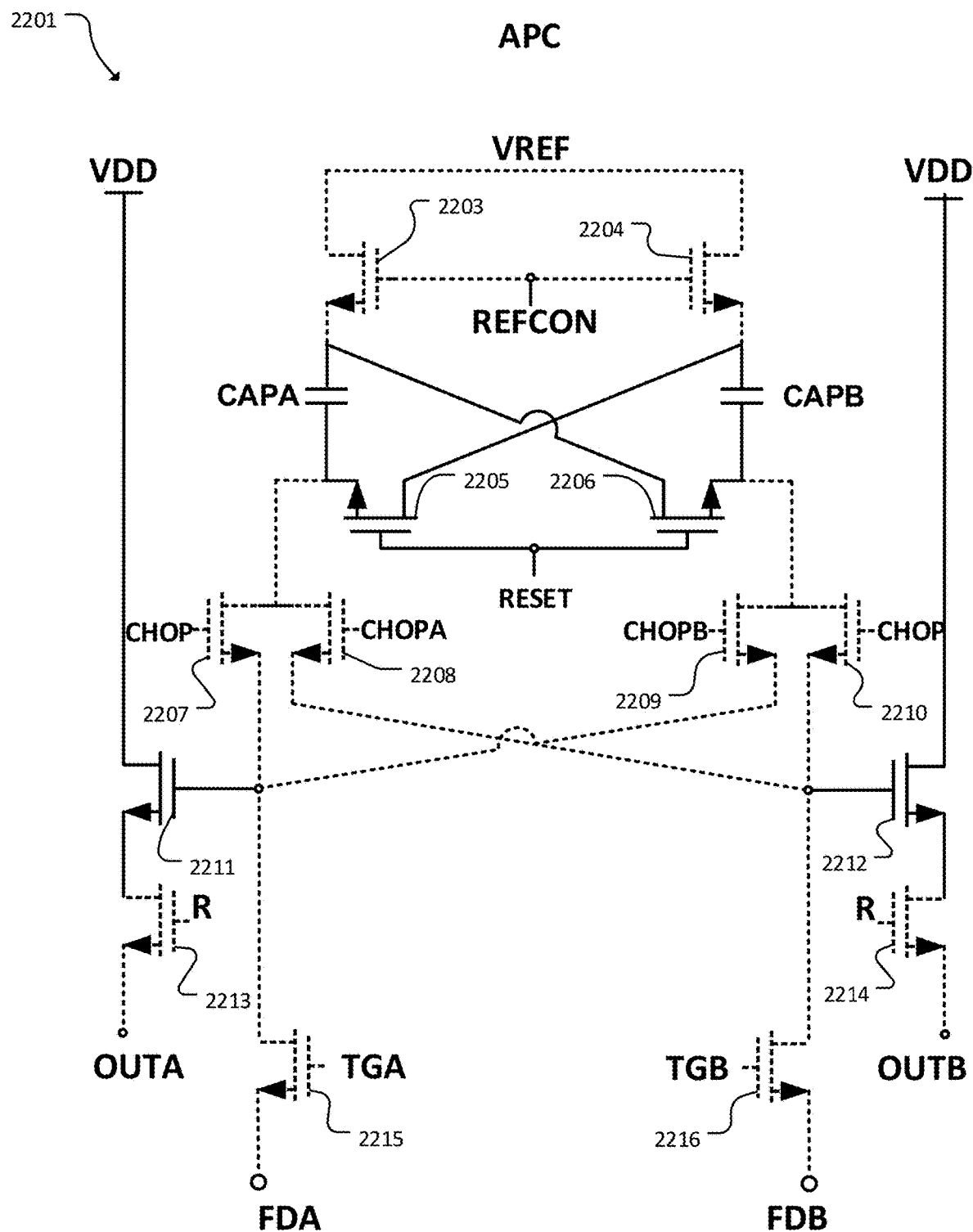
FIG. 25 is a schematic diagram of a 2FD APC based CMR circuit with chopper circuit at APC phase.

FIG. 25 illustrate the circuit configuration in the APC phase, which follows after the first integration phase. The transistor 2205, 2206 of the APC circuit are activated. The reference transistors 2203, 2104, the transfer transistors 2215, 2216, and the transistors 2207, 2208, 2209, 2210 of the chopper circuitry are deactivated.

Figure 26:
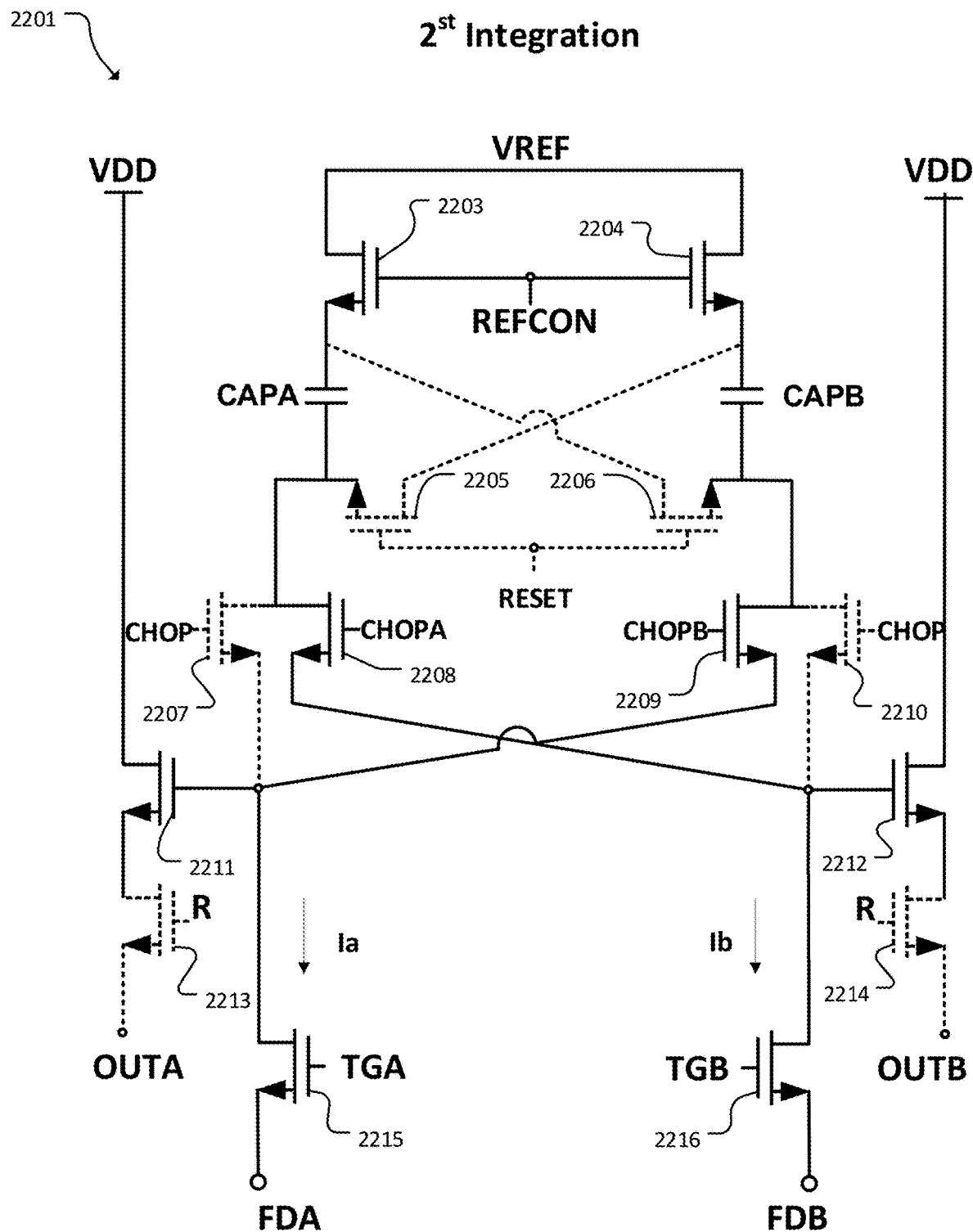
FIG. 26 is a schematic diagram of a 2FD APC based CMR circuit with chopper circuit at second integration phase.

FIG. 26 illustrates the circuit configuration in the second integration phase. In the second integration phase, transistors 2208, 2209 which are controlled by the CHOPB signal, the transfer transistors 2215, 2216, and the reference transistors 2203, 2204 are activated. The APC circuit 2202 is deactivated. That is, by means of the chopper circuitry, in the second integration phase, capacitor CAPA is connected to the right branch (FDB) and capacitor CAPB is connected to the left branch (FDA), whereas in the first integration phase, capacitor CAPA is connected to the left branch (FDA) and capacitor CAPB is connected to the right branch (FDB).

A second APC phase follows after the second integration, wherein the circuit has an identical configuration as in the first APC phase.

The phases as mentioned above can be repeated until the differential mode signal is large enough.

Figure 27:
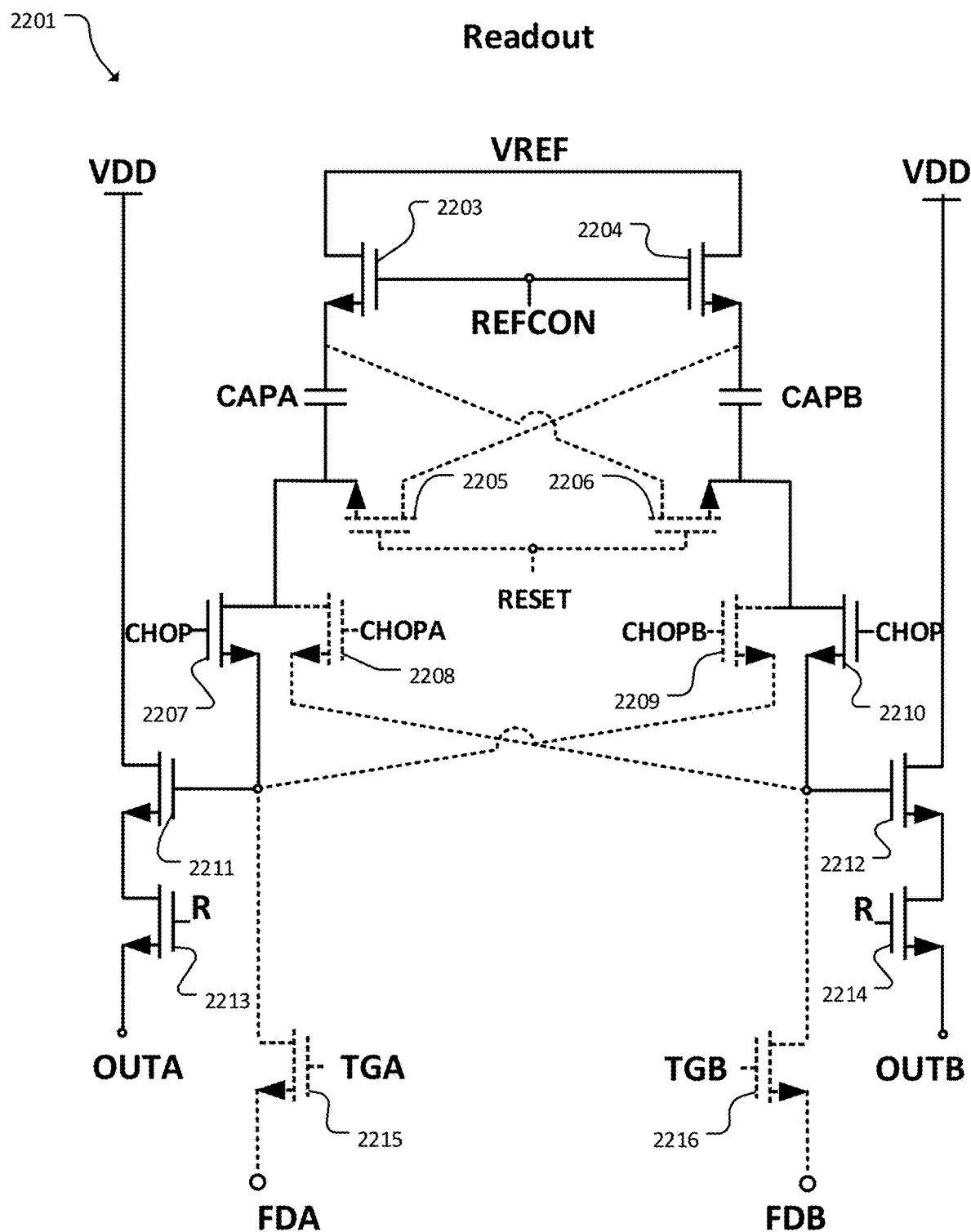
FIG. 27 is a schematic diagram of a 2FD APC based CMR circuit with chopper circuit at readout phase.

FIG. 27 illustrates the circuit configuration in the readout phase. In the readout phase, the reference transistor 2203, 2204, the transfer transistors 2215, 2216, the source followers 2211, 2212, the readout transistors 2213, 2214, and the transistors 2207, 2209 which are controlled by the CHOP signal are activated. The accumulated signals are amplified by source followers 2211, 2212 and transferred to readout transistors 2203, 2204.

[4FD Based Common Mode Rejection (CMR) Circuit without Anti Parallel Connection (APC)]

Figure 28:
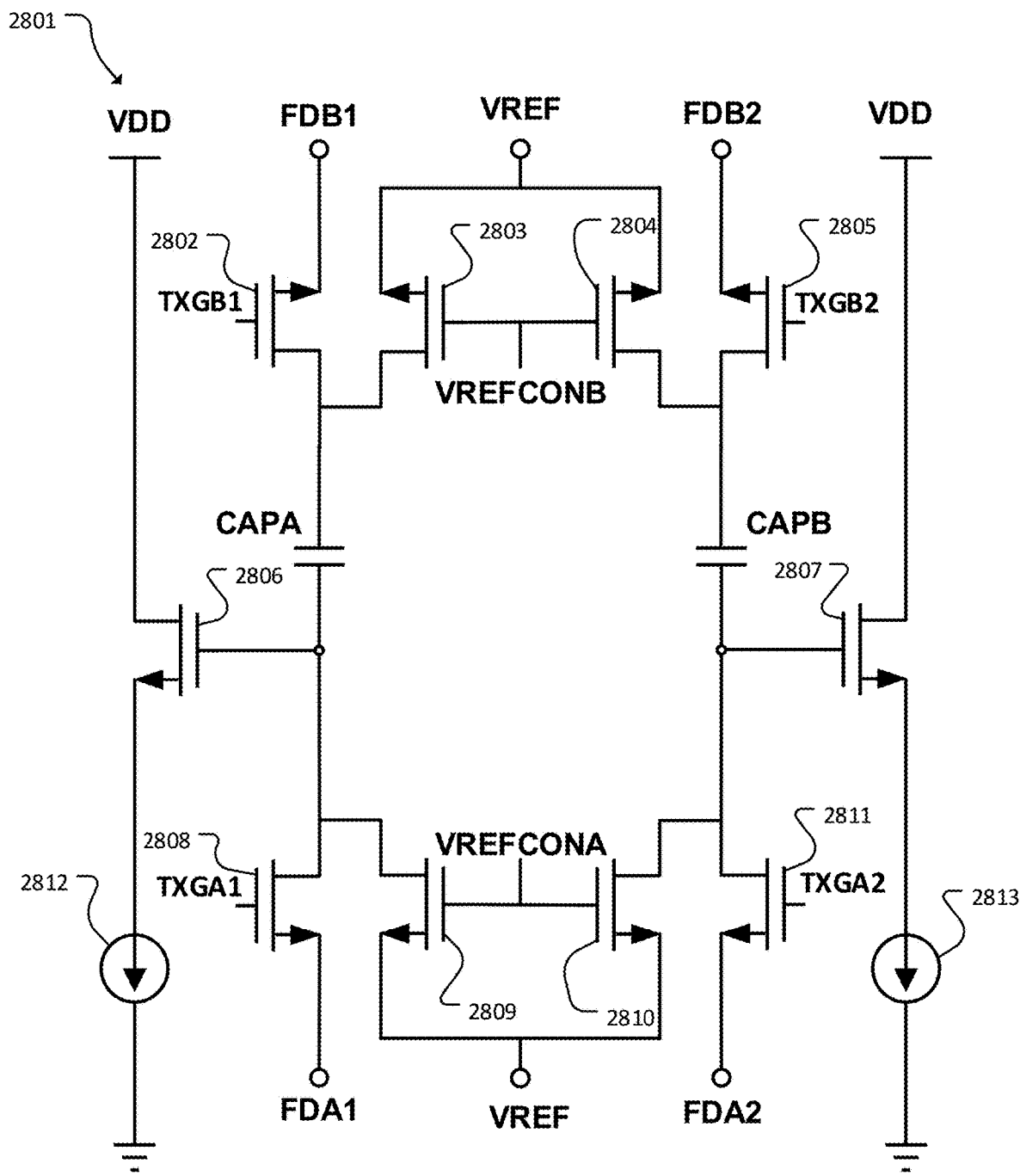
FIG. 28 is a schematic diagram of a 4FD based CMR circuit without APC.

FIG. 28 schematically shows, as a fifth embodiment, a 4FD based CMR circuit 2801 without APC.

The 4FD based CMR circuit 2801 without APC includes a DC reference voltage VREF, two reference control signals VREFCONA, VREFCONB, and four reference input switches 2803, 2804, 2809, 2810. Two capacitors CAPA, CAPB are provided to integrate current. By turning on and off the switches 2802, 2803, 25804, 2805, 2808, 2809, 2810, 2811 it is possible to control whether the integration at the capacitors CAPA, CAPB is done "from top side to bottom side" or otherwise.

To read out the output signal, source followers 2812, 2813 which amplify the output signal are provided at each output of the circuit. A voltage VDD supplies source followers 2812, 2813. Four FDs FDB1, FDB2, and FDA1, FDA2, are located at the top side and bottom side of the circuit respectively. Transfer gates 2802, 2805, 2808, 2811 are provided to transfer current from the floating diffusions FDB1, FDB2, FDA1, FDA2 to the capacitors CAPA, CAPB. The transfer gates 2802, 2805, 2808, 2811 are controlled by respective control signals TXGB1, TXGB2, TXGA1, TXGA2. The control signals TXGA1, TXGA2, TXGB1, TXGB2, VREFCONA, VREFCONB, are described in more detail below with regard to FIG. 29.

Figure 29:
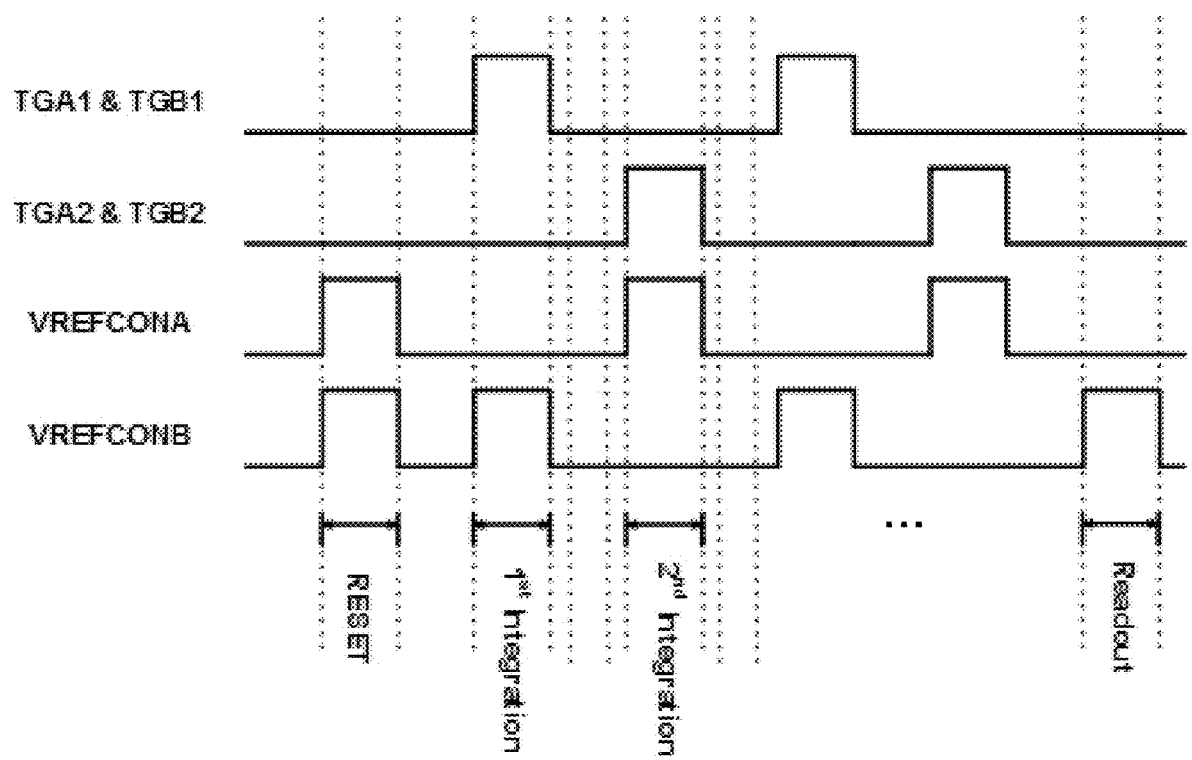
FIG. 29 is a CLK diagram of a 4FD based CMR circuit without APC.

FIG. 29 shows an example of a method of controlling the 4FD based CMR circuit 2801 without APC.

During a reset phase, the control signals TXGA1, TXGA2, TXGB1, TXGB2 (switches 2802, 2805, 2808, 2811 in FIG. 28) are driven low whereas the control signals VREFCONA and VREFCONB (switches 2803, 2804, 2809, 2810 in FIG. 28) are driven high.

During a first integration phase, the control signals TXGA1, TXGA2 (switches 2808, 2811 in FIG. 28) and VREFCONB (switches 2803, 2804 in FIG. 28) are driven high whereas the control signals TXGB1, TXGB2, VREFCONA (switches 2802, 2805, 2809, 2810 in FIG. 28) are driven low. The bottom sides of the capacitors (CAPA, CAPB in FIG. 28) are connected to the floating diffusions (FDA1, FDA2 in FIG. 28) while the top sides of the capacitors (CAPA, CAPB in FIG. 28) are connected to VREF.

In a second integration phase, the control signals TXGB1, TXGB2 and VREFCONA (switches 2802, 2805, 2809, 2810 in FIG. 28) are driven high whereas the control signals VREFCONB, TXGA1, TXGA2 (switches 2808, 2811, 2803, 2804 in FIG. 28) are driven low. The top sides of the first capacitor (CAPA in FIG. 28) and the second capacitor (CAPB in FIG. 28) are connected to the third floating diffusion (FDB1 in FIG. 28) and the fourth floating diffusion (FDB2 in FIG. 28) respectively. The bottom sides of both capacitors are connected to VREF.

At the readout phase, only the control signal VREFCONB (switches 904, 905 in FIG. 9) is driven high.

Implementation Example

Figure 30:
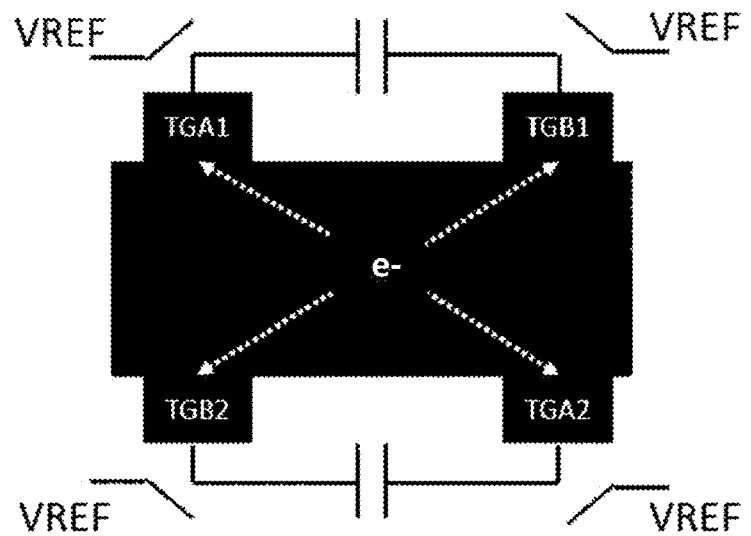
FIG. 30 is an implementation example of a of 4FD CMR circuit.

FIG. 30 shows one implementation example of a 4FD APC based CMR circuit. APC switches are neglected here. The transfer gates TGA1, TGA2, TGB1, TGB2 are placed in centroid positions to keep the structure as symmetry as possible. The centroid position of the transfer gates lower down the mismatch from the pixel since the chopping scheme cannot cancel out the mismatch brought in by the pixel. During odd number integration, the active light electrons either go to TGA1 or TGA2 and in even number integration, the active light electrons either go to TGB1 or TGB2.

It should be recognized that the embodiments describe methods with an exemplary ordering of method steps. The specific ordering of method steps is however given for illustrative purposes only and should not be construed as binding. For example, the order of the first integration phase and the second integration phase may generally be exchanged. For example, the first integration phase 801 and the second integration phase 803 in FIG. 8 may be exchanged. Other changes of the ordering of method steps may be apparent to the skilled person.

All units and entities described in this specification and claimed in the appended claims can, if not stated otherwise, be implemented as integrated circuit logic, for example on a chip.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to integrate charge (Q1, Q2) collected by at least two floating diffusions (FDA, FDB; FDA1, FDA2, FDB1, FDB2) on at least one capacitor (CAPA, CAPB) and to change the direction of charge integration from a first current flow direction to a second current flow direction between a first integration phase and a second integration phase.

(2) The electronic device of (1), in which each of the at least one capacitor (CAPA, CAPB; CAPA1) comprises a first side and a second side, the first current flow direction being from the first side to the second side, and the second current flow direction being from the second side to the first side.

(3) The electronic device of (1) or (2), wherein each of the at least one capacitor (CAPA, CAPB) comprises a first side and a second side, and wherein the circuitry is configured to connect, in the first integration phase, the first side of the at least one capacitor (CAPA, CAPB) to floating diffusions (FDA, FDB; FDA1, FDA2, FDB1, FDB2) and the second side of the at least one capacitor (CAPA, CAPB) to a reference voltage (VREF), and to connect, in the second integration phase, the second side of the at least one capacitor (CAPA, CAPB) to the floating diffusions (FDA, FDB; FDA1, FDA2, FDB1, FDB2) and the first side of the at least one capacitor (CAPA, CAPB) to a reference voltage (VREF).

(4) The electronic device of anyone of (1) to (3), comprising two capacitors, wherein the circuitry comprises APC circuitry (102; 902; 1602; 2202) for performing antiparallel coupling of the two capacitors (CAPA, CAPB) after an integration phase.

(5) The electronic device of (4), wherein a control signals (TXGA, TXGB, VREFCONA, VREFCONB, APC, CHA, CHB) is configured to control the circuity so that no APC is performed.

(6) The electronic device of (4) or (5), wherein control signals provided to APC switches (107, 108, 109, 110; 908, 909; 1605, 1606; 2205, 2206) are configured to be non-overlapping clock signals.

(7) The electronic device anyone of (1) to (6), wherein the circuity is configured to perform multiple integrations subsequently with different current flow directions.

(8) The electronic device of anyone of (1) to (7), wherein circuitry is further configured to provide a reset phase wherein the floating diffusions (FDA, FDB; FDA1, FDA2, FDB1, FDB) are reset to reference voltage (VREF).

(9) The electronic device of anyone of (1) to (8), wherein the circuitry comprises a first capacitor (CAPA) and a second capacitor (CAPB) and a first floating diffusion (FDA) and a second floating diffusion (FDB), and wherein the circuity is further configured to integrate, in the first integration phase, charge (Q1) collected by the first floating diffusion (FDA) on the first capacitor (CAPA) and charge (Q2) collected by the second floating diffusion (FDB) on the second capacitor (CAPB), and to integrate, in the second integration phase, charge (Q2) collected by the second floating diffusion (FDB) on the first capacitor (CAPA) and charge (Q1) collected by the first floating diffusion (FDA) on the second capacitor (CAPB).

(10) The electronic device of anyone of (1) to (8), wherein the circuitry comprises a first capacitor (CAPA) and a second capacitor (CAPB) and a first floating diffusion (FDA1), a second floating diffusion (FDA2), a third floating diffusion (FDB1), and a fourth floating diffusion (FDB2), and wherein the circuity is further configured to integrate, in the first integration phase, charge collected by the first floating diffusion (FDA1) on the first capacitor (CAPA) and charge collected by the second floating diffusion (FDA2) on the second capacitor (CAPB), and to integrate, in the second integration phase, charge collected by the third floating diffusion (FDB1) on the first capacitor (CAPA) and charge collected by the first floating diffusion (FDB2) on the second capacitor (CAPB).

(11) The electronic device of anyone of (1) to (9), further comprising a chopper circuitry (2217), wherein the chopper circuitry (2217) is configured to change the current directions between a first integration phase and a second integration phase.

(12) The electronic device of anyone of (1) to (11), further comprising circuitry for generating control signals (TXGA, TXGB, VREFCONA, VREFCONB, APC, CHA, CHB) for driving switches such that the direction of charge integration is changed.

(13) The electronic device of anyone of (1) to (12), further comprising source followers (111, 112; 907, 910; 1607, 1608; 2211, 2212; 2812, 2811) that are provided at each output of the circuit which amplifies the output signal

(14) The electronic device of anyone of (1) to (13), wherein the electronic device is a common mode rejection circuit.

(15) The electronic device of claim of anyone of (1) to (14), wherein the electronic device is implemented in a time of flight imaging sensor.

(16) A method comprising integrating charge (Q1, Q2) collected by at least two floating diffusions (FDA, FDB; FDA1, FDA2, FDB1, FDB2) on at least one capacitor (CAPA, CAPB; CAPA1), and changing the direction of charge integration from a first current flow direction to a second current flow direction between a first integration phase and a second integration phase.

The invention claimed is:

1. An electronic device comprising circuitry configured to integrate charge collected by at least two floating diffusions on at least one capacitor and to change the direction of charge integration from a first current flow direction to a second current flow direction between a first integration phase and a second integration phase; wherein each of the at least one capacitor comprises a first side and a second side, and wherein the circuitry is configured to connect, in the first integration phase, the first side of the at least one capacitor to floating diffusions and the second side of the at least one capacitor to a reference voltage, and to connect, in the second integration phase, the second side of the at least one capacitor to the floating diffusions and the first side of the at least one capacitor to a reference voltage.

2. The electronic device of claim 1, in which each of the at least one capacitor comprises a first side and a second side, the first current flow direction being from the first side to the second side, and the second current flow direction being from the second side to the first side.

3. The electronic device of claim 1, wherein the at least one capacitor comprises two capacitors, wherein the circuitry comprises circuitry for performing antiparallel coupling of the two capacitors after an integration phase.

4. The electronic device of claim 3, wherein a control signal is configured to control the circuitry so that no antiparallel coupling is performed.

5. The electronic device of claim 3, wherein control signals provided to switches in the circuitry for performing antiparallel coupling are configured to be non-overlapping clock signals.

6. The electronic device of claim 1, wherein the circuitry is configured to perform multiple integrations subsequently with different current flow directions.

7. The electronic device of claim 1, wherein the circuitry is further configured to provide a reset phase wherein the floating diffusions are reset to reference voltage.

8. The electronic device of claim 1, wherein the at least one capacitor comprises a first capacitor and a second capacitor and a first floating diffusion and a second floating diffusion, and wherein the circuitry is further configured to integrate, in the first integration phase, charge collected by the first floating diffusion on the first capacitor and charge collected by the second floating diffusion on the second capacitor, and to integrate, in the second integration phase, charge collected by the second floating diffusion on the first capacitor and charge collected by the first floating diffusion on the second capacitor.

9. The electronic device of claim 1, further comprising a chopper circuitry, wherein the chopper circuitry is configured to change the current directions between a first integration phase and a second integration phase.

10. The electronic device of claim 1, further comprising circuitry for generating control signals for driving switches such that the direction of charge integration is changed.

11. The electronic device of claim 1, further comprising source followers that are provided at each output of the circuitry for performing antiparallel coupling which amplifies the output signal.

12. The electronic device of claim 1, wherein the electronic device is a common mode rejection circuit.

13. The electronic device of claim 1, wherein the electronic device is implemented in a time of flight imaging sensor.

14. An electronic device comprising circuitry configured to integrate charge collected by at least two floating diffusions on at least one capacitor and to change the direction of charge integration from a first current flow direction to a second current flow direction between a first integration phase and a second integration phase, wherein the at least one capacitor comprises a first capacitor and a second capacitor and a first floating diffusion, a second floating diffusion, a third floating diffusion, and a fourth floating diffusion, and wherein the circuitry is further configured to integrate, in the first integration phase, charge collected by the first floating diffusion on the first capacitor and charge collected by the second floating diffusion on the second capacitor, and to integrate, in the second integration phase, charge collected by the third floating diffusion on the first capacitor and charge collected by the first floating diffusion on the second capacitor.

15. A method comprising integrating charge collected by at least two floating diffusions on at least one capacitor, and changing the direction of charge integration from a first current flow direction to a second current flow direction between a first integration phase and a second integration phase; wherein each of the at least one capacitor comprises a first side and a second side, and wherein the circuitry is configured to connect, in the first integration phase, the first side of the at least one capacitor to floating diffusions and the second side of the at least one capacitor to a reference voltage, and to connect, in the second integration phase, the second side of the at least one capacitor to the floating diffusions and the first side of the at least one capacitor to a reference voltage.

* * * * *